United States Patent
Ahn et al.

(10) Patent No.: US 10,138,311 B2
(45) Date of Patent: Nov. 27, 2018

(54) VINYL-BASED POLYMER AND METHOD OF PREPARING THE SAME

(71) Applicant: LG CHEM, LTD., Seoul (KR)

(72) Inventors: Seong Yong Ahn, Daejeon (KR); Kun Ji Kim, Daejeon (KR); Se Woong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/512,778

(22) PCT Filed: Jun. 3, 2016

(86) PCT No.: PCT/KR2016/005945
§ 371 (c)(1),
(2) Date: Mar. 20, 2017

(87) PCT Pub. No.: WO2016/195435
PCT Pub. Date: Dec. 8, 2016

(65) Prior Publication Data
US 2017/0291975 A1    Oct. 12, 2017

(30) Foreign Application Priority Data
Jun. 5, 2015 (KR) .................. 10-2015-0080158

(51) Int. Cl.
*C08F 214/06* (2006.01)
*C08F 14/06* (2006.01)
(Continued)

(52) U.S. Cl.
CPC ............ *C08F 214/06* (2013.01); *C08F 14/06* (2013.01); *C08F 18/16* (2013.01); *C08F 222/10* (2013.01)

(58) Field of Classification Search
USPC ........................................................ 526/345
See application file for complete search history.

(56) References Cited

U.S. PATENT DOCUMENTS

| 2,731,449 | A | 1/1956 | Rowland et al. |
| 2,897,169 | A | 7/1959 | Dazzi |

(Continued)

FOREIGN PATENT DOCUMENTS

| CN | 1117057 A | 2/1996 |
| CN | 101336254 A | 12/2008 |

(Continued)

OTHER PUBLICATIONS

The heterogeneous bulk polymerization of vinyl chloride, (Synthesis of Polymer Technology) edited by Wei, Jun, East China university of science and technology press, Feb. 28, 2011 (along with an English translation for the paragraphs cited by the Chinese examiner).

*Primary Examiner* — Mark Kaucher
*Assistant Examiner* — Henry Hu
(74) *Attorney, Agent, or Firm* — Dentons US LLP

(57) ABSTRACT

Provided are a vinyl chloride-based copolymer, as a secondary particle in which primary particles are assembled, which may exhibit excellent mechanical properties and transparency as well as excellent plasticity by having an average pore diameter of 100 nm or less and a porosity of 40 vol % or less, including 65 wt % to 97 wt % of a vinyl chloride-based monomer-derived repeating unit; and 3 wt % to 35 wt % of cis and trans isomers of an unsaturated fatty acid ester-derived repeating units, and including the repeating units respectively derived from the cis and trans isomers of the unsaturated fatty acid ester in a weight ratio of 60:40 to 99:1, and a method of preparing the same.

20 Claims, 9 Drawing Sheets

(51) Int. Cl.
*C08F 222/10* (2006.01)
*C08F 18/16* (2006.01)

(56) References Cited

U.S. PATENT DOCUMENTS

| | | | |
|---|---|---|---|
| 3,544,661 A | | 12/1970 | Oth et al. |
| 4,210,739 A | * | 7/1980 | Gallagher ............ C08F 214/06 526/325 |
| 4,748,218 A | | 5/1988 | Sharaby |
| 4,797,443 A | | 1/1989 | Sharaby et al. |
| 6,747,083 B2 | * | 6/2004 | Takaki ................. C08F 255/00 524/458 |
| 7,001,960 B2 | * | 2/2006 | Ooura ................... C08F 114/06 526/200 |
| 2008/0306217 A1 | | 12/2008 | Karjala et al. |
| 2010/0267912 A1 | | 10/2010 | Ahn et al. |
| 2017/0283533 A1 | * | 10/2017 | Ahn ..................... C08F 222/14 |

FOREIGN PATENT DOCUMENTS

| | | |
|---|---|---|
| CN | 101402701 A | 4/2009 |
| CN | 101506249 A | 8/2009 |
| EP | 0542720 A1 | 5/1993 |
| GB | 765488 | 1/1957 |
| JP | 6-287237 A | 10/1994 |
| KR | 10-0160332 B1 | 1/1999 |
| KR | 10-1133962 B1 | 4/2012 |

* cited by examiner

VINYL-BASED POLYMER AND METHOD OF PREPARING THE SAME

This application is a National Stage Application of International Application No. PCT/KR2016/005945 filed on Jun. 3, 2016, which claims the benefit of Korean Patent Application No. 10-2015-0080158 filed on Jun. 5, 2015, all of which are hereby incorporated by reference in their entirety for all purposes as if fully set forth herein.

CROSS-REFERENCE TO RELATED APPLICATIONS

This application claims the benefit of Korean Patent Application No. 2015-0080158, filed on Jun. 5, 2015, in the Korean Intellectual Property Office, the disclosure of which is incorporated herein in its entirety by reference.

TECHNICAL FIELD

The present invention relates to a vinyl-based polymer and a method of preparing the same, and more particularly, to a vinyl chloride-based copolymer having excellent mechanical properties and transparency as well as excellent plasticity and a method of preparing the same.

BACKGROUND ART

A vinyl chloride-based polymer is a homopolymer of vinyl chloride or a copolymer including 50% or more of vinyl chloride, wherein it has been widely used in areas, such as piping materials and building materials, due to excellent mechanical strength, weather resistance, and chemical resistance. However, since the vinyl chloride-based polymer by itself has low moldability, various additives, such as a plasticizer, are appropriately added to provide processability.

In general, the moldability of the vinyl chloride-based polymer largely depends on particle characteristics of the vinyl chloride-based polymer. Also, in order to improve productivity in the preparation of a molded article using the vinyl chloride-based polymer, there is a need to improve gelling properties, plasticizer absorbency, or powder flowability by controlling bulk density or internal porosity, a particle diameter, or particle distribution of vinyl chloride-based polymer particles.

As a typical method of improving the moldability of the vinyl chloride-based polymer, a method of improving processability of a vinyl chloride polymer itself by using a dispersion stabilizer, such as polyvinyl alcohol, during polymerization of the vinyl chloride-based polymer has been proposed. However, according to the above method, bulk specific gravity of the vinyl chloride-based polymer may be increased, but melting characteristics of the polymer may be deteriorated.

Accordingly, as a method of improving the melting characteristics as well as the processability of the vinyl chloride-based polymer, a method of controlling distribution of the degree of polymerization by changing temperature during the polymerization of the vinyl chloride-based polymer has been proposed. However, according to the above-described methods, a vinyl chloride-based polymer having high bulk density as well as improved processability may be prepared, but productivity may be reduced due to an increase in polymerization reaction time, and deterioration of physical properties of the polymer itself, for example, an increase in colorability or a decrease in mechanical properties, may occur due to a side reaction between an additive and a reactant, such as a vinyl chloride-based monomer, according to the changes in the polymerization temperature.

As another method of improving the moldability of the vinyl chloride-based polymer, a method of using a plasticizer with the vinyl chloride-based polymer in the preparation of a molded article has mainly been used. However, when the plasticizer is used as described above, since the plasticizer may move to a surface of the product, stickiness of the surface may occur and plasticity may be gradually reduced over time. In particular, with respect to a phthalate-based plasticizer mainly used, a lot of smoke may be generated during combustion, flexibility may occur at a considerably high temperature, and high energy may be required during processing.

Thus, there is a need to develop a method of preparing a vinyl chloride-based polymer which may prepare a vinyl chloride-based polymer having good processability as well as excellent mechanical properties with high polymerization productivity.

DISCLOSURE OF THE INVENTION

Technical Problem

The present invention provides a vinyl chloride-based copolymer having excellent plasticity, mechanical properties, and transparency.

The present invention also provides a method of preparing a vinyl chloride-based copolymer which may prepare the vinyl chloride-based copolymer in a high polymerization yield.

The present invention also provides a thermoplastic resin composition including the above vinyl chloride-based copolymer and a molded article prepared therefrom.

Technical Solution

According to an aspect of the present invention, there is provided a vinyl chloride-based copolymer as a secondary particle in which primary particles are assembled, wherein the vinyl chloride-based copolymer has an average pore diameter of 100 nm or less and a porosity of 40 vol % or less, includes 65 wt % to 97 wt % of a vinyl chloride-based monomer-derived repeating unit; and 3 wt % to 35 wt % of cis and trans isomers of an unsaturated fatty acid ester-derived repeating units, and includes the repeating units respectively derived from the cis and trans isomers of the unsaturated fatty acid ester in a weight ratio of 60:40 to 99:1.

According to another aspect of the present invention, there is provided a method of preparing a vinyl chloride-based copolymer including polymerizing a vinyl chloride monomer with cis and trans isomers of an unsaturated fatty acid ester in the presence of a polymerization initiator, wherein the vinyl chloride monomer and the cis and trans isomers of the unsaturated fatty acid ester are used in amounts to provide 65 wt % to 97 wt % of a vinyl chloride-based monomer-derived repeating unit and 3 wt % to 35 wt % of cis and trans isomers of the unsaturated fatty acid ester-derived repeating units in the prepared vinyl chloride-based copolymer, and the cis isomer and the trans isomer of the unsaturated fatty acid ester are used in a weight ratio of 60:40 to 99:1.

According to another aspect of the present invention, there is provided a thermoplastic resin composition including the vinyl chloride-based copolymer and a molded article prepared therefrom.

Advantageous Effects

A vinyl chloride-based copolymer according to the present invention may have excellent plasticity, mechanical properties, and transparency by using a mixture of cis and trans isomers of an unsaturated fatty acid ester in the preparation thereof. Also, there is no possibility of the occurrence of problems due to migration in the preparation process thereof, the use of an external plasticizer may be reduced during the subsequent preparation of a molded article, and the use of a conventional phthalate-based external plasticizer may be particularly reduced or replaced. Thus, the generation of environmental hormones may be reduced or prevented.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
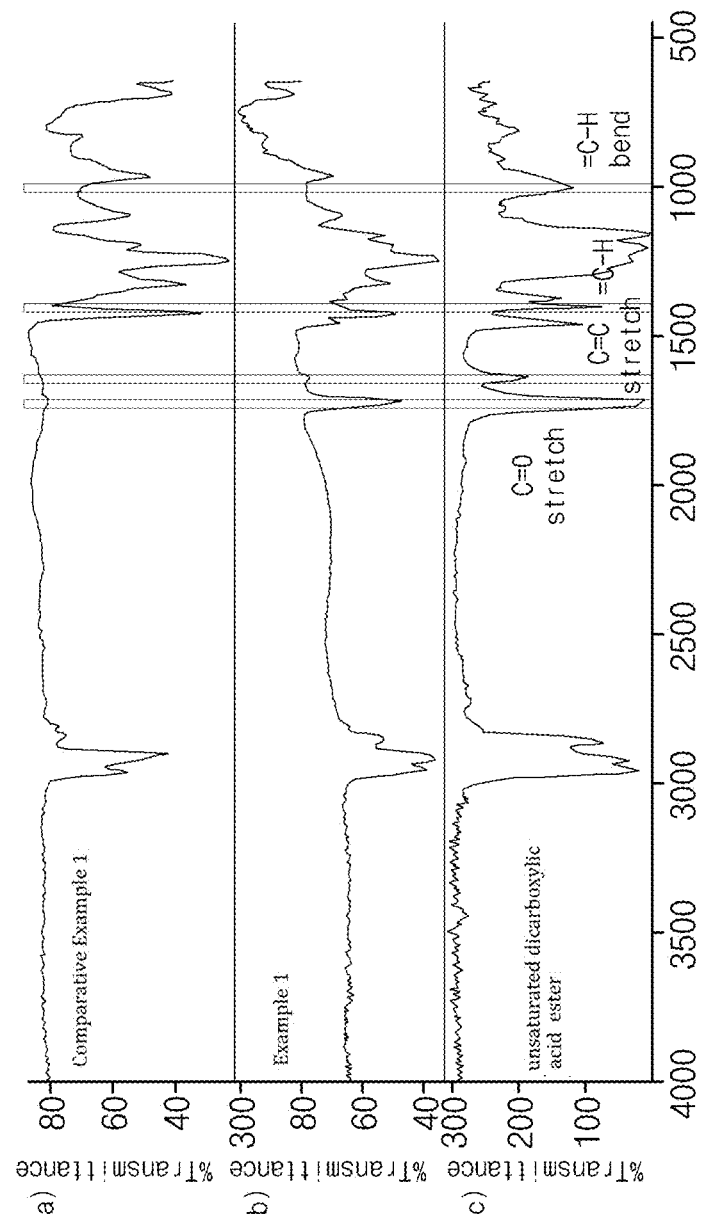
In FIG. 1, a) is the results of infrared (IR) spectroscopy analysis of a vinyl chloride homopolymer prepared in Comparative Example 1, b) is the results of IR analysis of a vinyl chloride-based copolymer prepared in Example 1, and c) is the results of IR analysis of an unsaturated dicarboxylic acid ester.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A vinyl chloride-based copolymer according to an embodiment of the present invention is in the form of a secondary particle in which primary particles are assembled, wherein the vinyl chloride-based copolymer has an average pore diameter of 100 nm or less and a porosity of 40 vol % or less, includes 65 wt % to 97 wt % of a vinyl chloride-based monomer-derived repeating unit; and 3 wt % to 35 wt % of cis and trans isomers of an unsaturated fatty acid ester-derived repeating units, and includes the repeating units respectively derived from the cis and trans isomers of the unsaturated fatty acid ester in a weight ratio of 60:40 to 99:1.

Specifically, in the vinyl chloride-based copolymer according to the embodiment of the present invention, the cis and trans isomers of the unsaturated fatty acid ester are not only comonomers which form a polymer chain with the vinyl chloride-based monomer during the preparation of the vinyl chloride-based copolymer, but also act as an internal plasticizer to reduce a size of pores and porosity in the particle of the vinyl chloride-based copolymer. Accordingly, as described above, the vinyl chloride-based copolymer according to the embodiment of the present invention includes pores finer than those of a conventional vinyl chloride-based polymer with lower porosity. Furthermore, the vinyl chloride-based copolymer according to the embodiment of the present invention has pore size and porosity, which are optimized to have significantly improved processability and transparency without a decrease in mechanical properties, by controlling a mixing ratio of the cis and trans isomers of the unsaturated fatty acid ester. Specifically, the pores included in the secondary particle of the vinyl chloride-based copolymer may have an average pore diameter of 100 nm or less, particularly 10 nm to 100 nm, more particularly 10 nm to 60 nm, and, for example, 10 nm to 20 nm or 10 nm to 15 nm. Also, the vinyl chloride-based copolymer may include the pores having the above average pore diameter in an amount of vol % or less, particularly 35 vol % or less, more particularly 20 vol % or less, and, for example, 10 vol % to 18 vol % or 10 vol % to 15 vol %, based on a total volume of the secondary particles. In a case in which the size of the pores included in the secondary particle is greater than 100 nm or the porosity is greater than 40 vol %, since an internal packing ratio of the comonomer is reduced, processability may be reduced. In the present invention, surface void ($P_{inter}$), accessible intravoid ($P_{acc}$), and inaccessible intravoid ($P_{inacc}$) may be respectively measured from amounts of mercury intruded into the copolymer particles by using a mercury porosimeter, specifically Auto Pore IV 9520 (Micrometrics Instrument Corporation), and the average pore diameter (4V/A) and porosity of the vinyl chloride-based copolymer may be respectively determined from the measurement results.

Also, the vinyl chloride-based copolymer according to the embodiment of the present invention satisfying the above-described pore characteristics and configuration requirements may have a low cold plasticizer absorption (CPA) of 10 wt % or less, particularly 7 wt % or less, and more particularly 1 wt % to 3 wt % due to an internal plasticization effect of the cis and trans isomers. In a case in which the cold plasticizer absorption is high at greater than 10 wt %, there is a possibility that mechanical properties may be deteriorated, but, in the present invention, since the vinyl chloride-based copolymer has low cold plasticizer absorption as described above, more improved plasticizing performance and mechanical properties may be obtained. In the present invention, the cold plasticizer absorption represents an amount of the plasticizer, specifically dioctyl phthalate, absorbed in a vinyl chloride-based copolymer sample as wt % with respect to the vinyl chloride-based copolymer sample before the absorption according to ASTM D2396 and ISO 4574. Specifically, in the present invention, the cold plasticizer absorption was measured under conditions of 3,900 rpm and 20° C. by using a Continent 512-R instrument by Hanil Science Industrial Co., Ltd.

Furthermore, the vinyl chloride-based copolymer according to the embodiment of the present invention satisfying the above-described pore characteristics and configuration requirements may have a K value of 55 or more, particularly 60 to 73, and more particularly 65 to 73. The vinyl chloride-based copolymer according to the embodiment of the present invention may have soft characteristics with the above-described range of K value due to the internal plasticization effect of the cis and trans isomers during the polymerization. In the present invention, the K value of the vinyl chloride polymer may be measured in a sodium chloride solution with a concentration of 5 wt % at a temperature of 25° C., a polymer concentration of 0.5 wt %, and a pH of 7.0 according to an article [H. Fikentscher, Cellulose Chemie, Vol. 13, 58-64 and 71-74 (1932)]. Also, the K value may be changed depending on polymerization temperature of the polymer, and the vinyl chloride-based copolymer of the present invention is polymerized at a polymerization temperature of 30° C. to 80° C., particularly 30° C. to 70° C., and more particularly 30° C. to 62° C.

Also, the vinyl chloride-based copolymer according to the embodiment of the present invention satisfying the above-described pore characteristics and configuration requirements may exhibit excellent plasticizing performance by having low hardness. Specifically, the vinyl chloride-based copolymer has a hardness of 50 HS to 110 HS, for example, 50 HS to 75 HS when measured according to ASTM D785-65.

Furthermore, the vinyl chloride-based copolymer according to the embodiment of the present invention satisfying the above-described pore characteristics and configuration requirements may have excellent mechanical properties as well as the above-described excellent plasticizing performance or processability. Specifically, the vinyl chloride-based copolymer may have a tensile strength of 5 MPa to 50 MPa, a strain of 40% to 750%, and an E-modulus of 400 N/cm$^2$ to 5,200 N/cm$^2$ when measured according to ASTM D638. For example, the vinyl chloride-based copolymer may have a tensile strength of 7 MPa to 15 MPa, a strain of 400% to 720%, and an E-modulus of 400 N/cm$^2$ to 3,000 N/cm$^2$.

Also, the vinyl chloride-based copolymer according to the embodiment of the present invention satisfying the above-described pore characteristics and configuration requirements may have a glass transition temperature (Tg) of −35° C. to 64° C., particularly −35° C. or more to less than −10° C., and more particularly −35° C. to −20° C. Thus, the vinyl chloride-based copolymer may have better processability by having the glass transition temperature lower than that of a conventional vinyl chloride-based polymer prepared without using a conventional plasticizer or using an external plasticizer. In the present invention, the Tg may be measured by using a differential scanning calorimeter (DSC) 2920 manufactured by TA Instruments, and, in this case, in order to eliminate thermal history, the measured value is obtained by second melting in which the temperature is increased at a rate of 10° C. per minute. In a measured DSC curve, the Tg is a temperature at an inflection point in which a heat flow is changed during an endothermic reaction.

The vinyl chloride-based copolymer according to the embodiment of the present invention achieving the above-described physical properties may include the cis and trans isomers of the unsaturated fatty acid ester-derived repeating units in a weight ratio of 60:40 to 99:1, particularly 80:20 to 99:1, more particularly 85:15 to 99:1, and, for example, 95:5 to 99:1. When the vinyl chloride-based copolymer according to the embodiment of the present invention includes the cis and trans isomers of the unsaturated fatty acid ester-derived repeating units within the above-described mixing ratio range, the above-described pore characteristics may be achieved, and excellent plasticity and mechanical properties as well as high polymerization conversion rate may also achieved in good balance. In a case in which the mixing ratio of the cis and trans isomers of the unsaturated fatty acid ester-derived repeating units is outside the above range, and particularly in a case in which an amount of the cis isomer-derived repeating unit is less than 60 wt %, greater than 99 wt %, or 100 wt % based on a total weight of the cis and trans isomers-derived repeating units, the preparation of a vinyl chloride-based copolymer satisfying the pore characteristics of the present invention may be difficult, and, as a result, improvements in the plasticity and transparency may be difficult to be obtained with excellent mechanical properties. Also, in a case in which an amount of the trans isomer-derived repeating unit is greater than 40 wt % based on the total weight of the cis and trans isomers-derived repeating units, there is a possibility that a phenomenon of agglomeration of the trans isomers may occur instead of the formation of the vinyl chloride-based copolymer.

The vinyl chloride-based copolymer according to the embodiment of the present invention achieving the above-described physical properties, for example, may include 65 wt % to 97 wt % of the vinyl chloride-based monomer-derived repeating unit; and 3 wt % to 35 wt % of a comonomer of the cis and trans isomers of the unsaturated fatty acid ester-derived repeating unit, and, in this case, the vinyl chloride-based copolymer may include the cis isomer-derived repeating unit and the trans isomer-derived repeating unit of the unsaturated fatty acid ester in a weight ratio of 60:40 to 99:1, particularly 80:20 to 99:1, more particularly 85:15 to 99:1, and, for example, 95:5 to 99:1. In a case in which the amount of the vinyl chloride-based monomer-derived repeating unit in the vinyl chloride-based copolymer is greater than 97 wt % and a total amount of the comonomer of the cis and trans isomers of the unsaturated fatty acid ester-derived repeating units is less than 3 wt %, there is a possibility that a reverse plasticization phenomenon may occur to deteriorate physical properties, specifically mechanical properties, of the vinyl chloride-based copolymer. Also, in a case in which the amount of the vinyl chloride-based monomer-derived repeating unit in the vinyl chloride-based copolymer is less than 65 wt % and the total amount of the comonomer of the cis and trans isomers of the unsaturated fatty acid ester-derived repeating unit is greater than 35 wt %, the polymerization is not only easy, but also a large particle may be formed or the mechanical properties may be significantly deteriorated due to the inclusion of the excessive comonomer-derived repeating unit.

Specifically, in consideration of good balanced improvements in the polymerization conversion rate, plasticity, and mechanical properties along with the achievement of the above-described pore characteristics, the vinyl chloride-based copolymer according to the embodiment of the present invention may include 65 wt % to 80 wt % of the vinyl chloride-based monomer-derived repeating unit; and 20 wt % to 35 wt % of the comonomer of the cis and trans isomers of the unsaturated fatty acid ester-derived repeating unit, and may include the cis and trans isomers of the unsaturated fatty acid ester-derived repeating units in a weight ratio of 60:40 to 99:1, particularly 80:20 to 99:1, more particularly 85:15 to 99:1, and, for example, 95:5 to 99:1.

Furthermore, in the vinyl chloride-based copolymer, the unsaturated fatty acid ester may specifically be an unsaturated dicarboxylic acid ester. Specifically, the cis isomer of the unsaturated fatty acid ester may be a dialkyl maleate-based compound of the following Formula 1, and the trans isomer of the unsaturated fatty acid ester may be a dialkyl fumarate-based compound of the following Formula 2:

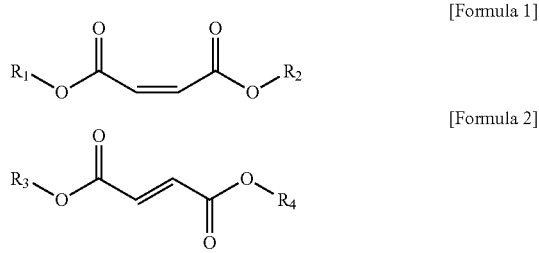

[Formula 1]

[Formula 2]

in Formulae 1 and 2, $R_1$ to $R_4$ may each independently be selected from the group consisting of an alkyl group having 2 to 16 carbon atoms, a cycloalkyl group having 3 to 16 carbon atoms, and a combination thereof, and, for example, may be a linear or branched alkyl group having 4 to 14 carbon atoms.

In the present invention, the expression "a combination thereof", unless specially mentioned otherwise, denotes that two or more functional groups are bonded by a single bond, a double bond (ethylene group), a triple bond (acetylene group) or a linking group such as an alkylene group having 1 to 20 carbon atoms (e.g., methylene group (—$CH_2$), ethylene group (—$CH_2CH_2$—), etc.), or two or more functional groups are connected by condensation.

Specific examples of the cis and trans isomers of the unsaturated fatty acid ester may be dibutyl maleate and fumarate; dihexyl maleate and fumarate; di(2-ethylhexyl) maleate and fumarate; di(ethyldodecyl) maleate and fumarate; didecyl maleate and fumarate; diundecyl maleate and fumarate; didodecyl maleate and fumarate; or ditridecyl maleate and fumarate.

In Formulae 1 and 2, when lengths of carbon chains of R1 to R4 are long, migration may be good, but plasticizing properties may be reduced, and when the lengths of the carbon chains are short, the plasticizing properties may be good, but the migration may be reduced. In consideration of the balance of the migration and plasticizing properties according to the lengths of the carbon chains and resultant improvements in the mechanical properties and plasticity of the copolymer, good balanced improvements in the mechanical properties, plasticity, and transparency may be obtained when $R_1$ to $R_4$ in Formulae 1 and 2 are each independently a linear or branched alkyl group having 6 to 10 carbon atoms, particularly an alkyl group having 6 to 8 carbon atoms or 8 to 10 carbon atoms, and more particularly an alkyl group having 6, 8, and 10 carbon atoms.

Also, in consideration of improvements in the mechanical properties and plasticity, $R_1$ to $R_4$ in Formulae 1 and 2 are each independently a linear alkyl group having 14 carbon atoms.

Specifically, the vinyl chloride-based copolymer according to the embodiment of the present invention achieving the above-described structure and physical properties includes 65 wt % to 97 wt % of the vinyl chloride-based monomer-derived repeating unit; and 3 wt % to 35 wt % of the cis and trans isomers of the unsaturated fatty acid ester-derived repeating units, and includes the repeating units respectively derived from the cis isomer and the trans isomer of the unsaturated fatty acid ester in a weight ratio of 80:20 to 99:1, wherein the cis isomer of the unsaturated fatty acid ester is the compound of Formula 1, the trans isomer of the unsaturated fatty acid ester is the compound of Formula 2, and, in this case, $R_1$ to $R_4$ in Formulae 1 and 2 are each independently a linear or branched alkyl group having 4 to 14 carbon atoms.

For example, the vinyl chloride-based copolymer according to the embodiment of the present invention achieving the above-described structure and physical properties with a better effect may include 65 wt % to 80 wt % of the vinyl chloride-based monomer-derived repeating unit; and 20 wt % to 35 wt % of the cis and trans isomers of the unsaturated fatty acid ester-derived repeating units, and may include the repeating units respectively derived from the cis isomer and the trans isomer of the unsaturated fatty acid ester in a weight ratio of 60:40 to 99:1, particularly 80:20 to 99:1, more particularly 85:15 to 99:1, and, for example, 95:5 to 99:1, wherein the cis isomer of the unsaturated fatty acid ester may be the compound of Formula 1, the trans isomer of the unsaturated fatty acid ester may be the compound of Formula 2, and, in this case, $R_1$ to $R_4$ in Formulae 1 and 2 may each independently be a linear or branched alkyl group having 4 to 14 carbon atoms, particularly a linear or branched alkyl group having 6 to 10 carbon atoms, more particularly an alkyl group having 6 to 8 carbon atoms or 8 to 10 carbon atoms, and, for example, an alkyl group having 6, 8, and 10 carbon atoms.

The vinyl chloride-based copolymer according to the embodiment of the present invention having the above-described configuration may have a narrow molecular weight distribution in which a polydispersity (PDI), a ratio (Mw/Mn) of a weight-average molecular weight (Mw) to a number-average molecular weight (Mn), is in a range of 1.5 to 2.5. In a case in which the PDI of the vinyl chloride-based copolymer is greater than 2.5, mechanical properties, such as wear resistance and impact resistance, may be deteriorated. Also, in consideration of significant improvement in the mechanical properties of the polymer according to the control of the polydispersity, the polydispersity of the vinyl chloride-based copolymer may specifically be in a range of 1.8 to 2.1.

Also, the vinyl chloride-based copolymer according to the embodiment of the present invention may have a weight-average molecular weight (Mw) of 70,000 g/mol to 300,000 g/mol, for example, 90,000 g/mol to 280,000 g/mol. Furthermore, the vinyl chloride-based copolymer according to the embodiment of the present invention may have a number-average molecular weight (Mn) of 50,000 g/mol to 150,000 g/mol, for example, 50,000 g/mol to 70,000 g/mol.

In a case in which the weight-average molecular weight or the number-average molecular weight of the vinyl chloride-based copolymer is outside the above range or the above-described polydispersity range, good balanced improvements in the processability and mechanical properties are not easy. In the present invention, each of the weight-average molecular weight and the number-average molecular weight is a polystyrene-equivalent molecular weight analyzed by gel permeation chromatography (GPC).

Furthermore, a degree of polymerization of the vinyl chloride-based copolymer according to the embodiment of the present invention may be determined according to a polymerization temperature during the polymerization, and the use of the vinyl chloride-based copolymer may vary according to the degree of polymerization. Specifically, the degree of polymerization of the vinyl chloride-based copolymer according to the embodiment of the present invention may be in a range of 700 to 3,000, for example, 700 to 1,500, and, in consideration of significant improvements in the processability and transparency according to the control of the degree of polymerization as well as the pore characteristics, the degree of polymerization of the vinyl chloride-based copolymer may be in a range of 1,000 to 1,300.

The vinyl chloride-based copolymer according to the embodiment of the present invention having the above-described structural and configurational features may be prepared by polymerization of a vinyl chloride monomer with the cis and trans isomers of the unsaturated fatty acid ester. In this case, the vinyl chloride monomer and the cis and trans isomers of the unsaturated fatty acid ester are used in amounts to provide 65 wt % to 97 wt % of the vinyl chloride-based monomer-derived repeating unit and 3 wt % to 35 wt % of the cis and trans isomers of the unsaturated fatty acid ester-derived repeating units in the prepared vinyl chloride-based copolymer, wherein the cis isomer and the trans isomer of the unsaturated fatty acid ester may be used in a weight ratio of 60:40 to 99:1, particularly 80:20 to 99:1, more particularly 85:15 to 99:1, and, for example, 95:5 to 99:1. According to another embodiment of the present invention, a method of preparing the vinyl chloride-based copolymer is provided.

Specifically, the vinyl chloride-based copolymer according to the embodiment of the present invention may be prepared by suspension polymerization, emulsion polymerization, solution polymerization, or bulk polymerization of a vinyl chloride monomer with a mixture of isomers of an unsaturated fatty acid ester in the presence of a polymerization initiator.

In the preparation of the vinyl chloride-based copolymer, the above-described cis isomer of the unsaturated dicarboxylic acid ester of Formula 1 and the trans isomer compound of formula 2 may be used as the mixture of the isomers of the unsaturated fatty acid ester. The mixture of the isomers of the unsaturated fatty acid ester may be used by purchasing a commercially available product or may be used by being prepared according to a typical preparation method, for example, a reaction of aliphatic alcohol with maleic anhydride or fumaric acid.

Also, in the preparation of the vinyl chloride-based copolymer, the vinyl chloride-based monomer and the mixture of the isomers of the unsaturated fatty acid ester may be used in amounts to provide 65 wt % to 97 wt % of the vinyl chloride-based monomer-derived repeating unit and 3 wt % to 35 wt % of the isomers of the unsaturated fatty acid ester-derived repeating units in the finally prepared vinyl chloride-based copolymer, and the mixture of the isomers of the unsaturated fatty acid ester may be mixed and used in amounts to provide a weight ratio of the repeating units respectively derived from the cis isomer and the trans isomer of the unsaturated fatty acid ester ranging from 80:20 to 99:1. Specifically, the vinyl chloride-based monomer and the mixture of the isomers of the unsaturated fatty acid ester may be used in amounts to provide 65 wt % to 80 wt % of the vinyl chloride-based monomer-derived repeating unit and 20 wt % to 35 wt % of the isomers of the unsaturated fatty acid ester-derived repeating units in the finally prepared vinyl chloride-based copolymer, and the mixture of the isomers of the unsaturated fatty acid ester may be mixed and used in amounts to provide a weight ratio of the repeating units respectively derived from the cis isomer and the trans isomer of the unsaturated fatty acid ester ranging from 60:40 to 99:1, particularly ranging from 80:20 to 99:1, more particularly ranging from 85:15 to 99:1, and, for example, ranging from 95:5 to 99:1.

Furthermore, in the preparation of the vinyl chloride-based copolymer, the polymerization initiator may be used without particular limitations as long as it is typically used as a polymerization initiator in the preparation of a vinyl chloride-based monomer. Specific examples of the polymerization initiator may be a peroxide-based compound such as dicumyl peroxide, dipentyl peroxide, di-3,5,5-trimethyl hexanoyl peroxide, or dilauryl peroxide; a peroxydicarbonate-based compound such as diisopropyl peroxydicarbonate, di-sec-butyl peroxydicarbonate, or di-2-ethylhexyl peroxydicarbonate; a peroxyester-based compound such as t-butyl peroxypivalate, 1,1,3,3-tetramethylbutyl peroxyneodecanoate, or t-butyl peroxyneodecanoate; an azo-based compound such as azobis-2,4-dimethylvaleronitrile; a hydroperoxide-based compound such as t-butyl hydroperoxide; or a sulfate-based compound such as potassium persulfate or ammonium persulfate, and any one thereof or a mixture of two or more thereof may be used.

The polymerization initiator may be used in an amount of 0.02 part by weight to 0.2 part by weight based on 100 parts by weight of a total monomer including the vinyl chloride-based monomer and the comonomer mixture of the isomers of the unsaturated fatty acid ester which are used in the vinyl chloride-based polymerization. When the amount of the polymerization initiator is less than 0.02 part by weight, since polymerization reaction time may be increased and polymerization conversion efficiency may be decreased, productivity may be reduced. When the amount of the polymerization initiator is greater than 0.2 part by weight, since the polymerization initiator may not be completely consumed during a polymerization process but may remain in the finally prepared copolymer, physical properties, particularly thermal stability, of the copolymer may be reduced. Thus, in consideration of improvements in the polymerization conversion efficiency and the physical properties of the finally prepared copolymer according to the used of the polymerization initiator, the polymerization initiator may be used in an amount of 0.04 part by weight to 0.12 part by weight based on 100 parts by weight of the total monomer.

Hereinafter, the preparation of the vinyl chloride-based copolymer according to the embodiment of the present invention will be described in more detail for each polymerization method.

First, with respect to a suspension polymerization method, the vinyl chloride-based copolymer may be prepared by reaction of a vinyl chloride-based monomer with cis and trans isomers of an unsaturated fatty acid ester in a solvent, specifically water or deionized water, in the presence of a polymerization initiator and a protective colloid auxiliary. Specifically, the protective colloid auxiliary, the vinyl chloride-based monomer, and the cis and trans isomers of the unsaturated fatty acid ester are added and mixed in the solvent, and the vinyl chloride-based copolymer may then be prepared by adding the polymerization initiator to perform polymerization. In this case, specific types and amounts of the vinyl chloride-based monomer, the cis and trans isomers of the unsaturated fatty acid ester, and the polymerization initiator are the same as those described above. Also, water or deionized water may be used as the solvent, and an amount of the solvent used may be appropriately determined according to the amount of the monomers used for preparing the copolymer according to the present invention. Specifically, the solvent may be used in an amount of 70 parts by weight or more, for example, 90 parts by weight or more, based on 100 parts by weight of a total sum of the monomers for preparing the copolymer.

Specifically, in the suspension polymerization, the polymerization initiator may be one, which may be dissolved in the vinyl chloride-based monomer, among the above-described polymerization initiators. Specific examples of the polymerization initiator may be a peroxide-based compound such as dicumyl peroxide; a peroxydicarbonate-based compound such as di-2-ethylhexyl peroxydicarbonate; a peroxyester-based compound such as t-butyl peroxyneodecanoate or 1,1,3,3-tetramethylbutyl peroxyneodecanoate; or an azo-based compound, and any one thereof or a mixture of two or more thereof may be used.

Also, in the suspension polymerization, the protective colloid auxiliary may be used without particular limitations as long as it is typically used in the preparation of a vinyl chloride-based monomer by suspension polymerization. Specific examples of the protective colloid auxiliary may be a vinyl alcohol-based resin, cellulose, or an unsaturated organic acid polymer, and any one thereof or a mixture of two or more thereof may be used.

Furthermore, as the protective colloid auxiliary, the vinyl alcohol-based resin having a degree of hydration of 30 wt % to 90 wt % may specifically be used, and, for example, a mixture of a first polyvinyl alcohol having a degree of hydration of greater than 50 wt % and equal to or less than 90 wt % and a second polyvinyl alcohol having a degree of hydration of 30 wt % to 50 wt % may be used. In this case, a mixing ratio of the first polyvinyl alcohol to the second polyvinyl alcohol may be 2:1 to 1:2, for example, 5:4 to 2:3.

Also, as the protective colloid auxiliary, specific examples of the cellulose may be methyl cellulose, hydroxyethylcellulose, or hydroxypropylmethylcellulose, and any one thereof or a mixture of two or more thereof may be used. Among these, the cellulose may be hydroxypropylmethylcellulose, and, for example, an amount of a hydroxypropyl group in the molecule may be in a range of 3 wt % to 20 wt % and a viscosity of 2% aqueous solution at 23±5° C. may be in a range of 10 cps to 20,000 cps.

Furthermore, as the protective colloid auxiliary, specific examples of the unsaturated organic acid polymer may be an acrylic acid polymer, a methacrylic acid polymer, an itaconic acid polymer, a fumaric acid polymer, a maleic acid polymer, or a succinic acid polymer, and any one thereof or a mixture of two or more thereof may be used.

Specifically, the protective colloid auxiliary usable in the suspension polymerization may include a mixture of a vinyl alcohol-based resin and a cellulose-based resin, and, for example, may include a mixture in which the vinyl alcohol-based resin and the cellulose-based resin are mixed in a ratio (weight ratio) of 5:1 to 7:7.

The protective colloid auxiliary may be used in an amount of 0.03 part by weight to 5 parts by weight based on 100 parts by weight of the total monomer including the vinyl chloride-based monomer and the comonomer mixture of the isomers which are used in the preparation of the vinyl chloride-based copolymer. When the amount of the protective colloid auxiliary is less than 0.03 part by weight, since a size of the secondary particle is excessively increased, fish-eye may occur. When the amount of the protective colloid auxiliary is greater than 5 parts by weight, initial colorability may be reduced due to an increase in fine particles. In consideration of significant improvements in the polymerization efficiency and physical properties of the vinyl chloride copolymer according to the used of the protective colloid auxiliary, the protective colloid auxiliary may be used in an amount of 0.05 part by weight to 2.5 parts by weight based on 100 parts by weight of the total monomer.

Also, the suspension polymerization may be performed by a two-step polymerization reaction.

Specifically, the suspension polymerization includes performing a primary suspension polymerization reaction of a vinyl chloride-based monomer with cis and trans isomers of an unsaturated fatty acid ester in a solvent, specifically water or deionized water, in the presence of a polymerization initiator and a protective colloid auxiliary; and performing a secondary suspension polymerization reaction of a polymer obtained as a result of the primary suspension polymerization and an unreacted monomer with cis and trans isomers of an unsaturated fatty acid ester in a solvent, specifically water or deionized water, in the presence of a polymerization initiator and a protective colloid auxiliary, wherein the primary suspension polymerization may be performed until a polymerization conversion rate is 10% or more, for example, 15% or more, and the secondary suspension polymerization may be performed until the polymerization conversion rate is 80% or more, for example, 85% or more, or a polymerization reactor pressure reaches 6.0 kg/cm$^2$. Materials used in this case and amounts thereof are the same as those described above.

Thus, in a case in which the suspension polymerization is performed in two steps, plasticizing performance may be further improved by increasing the conversion rate of the copolymer.

With respect to an emulsion polymerization method, a vinyl chloride-based copolymer may be prepared by reaction of a vinyl chloride-based monomer with cis and trans isomers of an unsaturated fatty acid ester in a solvent, specifically water or deionized water, in the presence of an emulsifier as well as a polymerization initiator. Specifically, the emulsifier, the vinyl chloride-based monomer, and the cis and trans isomers of the unsaturated fatty acid ester are sequentially added to the solvent, and the vinyl chloride-based copolymer may then be prepared by adding the polymerization initiator to perform polymerization. In this case, types and amounts of the vinyl chloride-based monomer and the cis and trans isomers of the unsaturated fatty acid ester are the same as those described above.

Specifically, in the emulsion polymerization, the polymerization initiator may be used without particular limitations as long as it may be one, which may be dissolved in the solvent, specifically water or deionized water, among the above-described polymerization initiators. Specific examples of the polymerization initiator may be a sulfate-based compound such as potassium persulfate or ammonium per sulfate.

Also, in the emulsion polymerization, the emulsifier may be used without particular limitations as long as it is typically used in the preparation of a vinyl chloride-based monomer by suspension polymerization. Specific examples of the emulsifier may be sodium lauryl sulfate, potassium stearate, alkylbenzene sulfate, or ammonium dialkyl sulfosuccinate, and any one thereof or a mixture of two or more thereof may be used.

The emulsifier may be used in an amount of 0.0001 part by weight to 1 part by weight based on 100 parts by weight of the total monomer including the vinyl chloride-based monomer and the comonomer mixture of the isomers which are used in the preparation of the vinyl chloride-based copolymer. When the amount of the emulsifier is less than 0.0001 part by weight, polymerization efficiency may be reduced, and, when the amount of the emulsifier is greater than 1 part by weight, there is a possibility that processability may be reduced due to the unreacted emulsifier and the increase in fine particles. In consideration of significant improvements in the polymerization efficiency and the physical properties of the finally prepared vinyl chloride-based copolymer according to the used of the emulsifier, the emulsifier may be used in an amount of 0.0005 part by weight to 0.1 part by weight based on 100 parts by weight of the total monomer.

Furthermore, with respect to a solution polymerization method, a vinyl chloride-based copolymer may be prepared by reaction of a vinyl chloride-based monomer with cis and trans isomers of an unsaturated fatty acid ester in a polymerization solvent in the presence of a polymerization initiator. In this case, types and amounts of the vinyl chloride-based monomer, the cis and trans isomers of the unsaturated fatty acid ester, and the polymerization initiator are the same as those described above.

Specifically, in the solution polymerization, the polymerization initiator may be one, which may be dissolved in the polymerization solvent, among the above-described polymerization initiators. Specific examples of the polymerization initiator may be a peroxide-based compound, a hydroperoxide-based compound, or an azo-based compound, and any one thereof or a mixture of two or more thereof may be used.

Also, in the solution polymerization, water or an inert organic solvent may be used as the polymerization solvent. The inert organic solvent may include an aliphatic hydrocarbon-based compound such as butane, pentane, and octane; cycloalkane; an aromatic hydrocarbon-based compound such as benzene and toluene; an alicyclic hydrocarbon-based compound such as cyclohexane; a ketone-based compound such as cyclohexanone and acetone; an alcohol-based compound such as isopropanol; or a cyclic ether-based compound such as tetrahydrofuran, and any one thereof or a mixture of two or more thereof may be used. The vinyl chloride-based copolymer formed as a result of the solution polymerization may be obtained in a state of being dissolved in the above-described inert organic solvent or may be obtained as a precipitated phase.

Furthermore, with respect to a bulk polymerization method, the method may be performed by reaction of a vinyl chloride-based monomer with cis and trans isomers of an unsaturated fatty acid ester in the presence of a polymerization initiator without a solvent. Specifically, the method may performed by adding the polymerization initiator to the vinyl chloride monomer to form a particle nucleus having a polymerization conversion rate of 5% to 10%, and mixing the formed particle nucleus with the vinyl chloride-based monomer, the cis and trans isomers of the unsaturated fatty acid ester, and the polymerization initiator and performing a polymerization reaction. In this case, types and amounts of the vinyl chloride-based monomer, the cis and trans isomers of the unsaturated fatty acid ester, and the polymerization initiator are the same as those described above.

Specifically, in the bulk polymerization, the polymerization initiator may be one, which may be used in the vinyl chloride-based monomer, among the above-described polymerization initiators. Specific examples of the polymerization initiator may be a peroxide-based compound, a hydroperoxide-based compound, or an azo-based compound, and any one thereof or a mixture of two or more thereof may be used.

During the polymerization reaction according to various polymerization methods as described above, the vinyl chloride-based monomer may be collectively added at once or may be dividedly added in two or more portions.

In a case in which the vinyl chloride-based monomer is dividedly added in two or more portions, the vinyl chloride-based monomer may be further added when the polymerization conversion rate is in a range of 10% to 70%. In a case in which the addition is performed when the polymerization conversion rate is less than 10%, an effect of increasing polymerization productivity for each batch according to the divided addition is insignificant, and, in a case in which the addition is performed when the polymerization conversion rate is greater than 70%, there is a possibility that it may adversely affect bulk density due to the increase in fine particles and it may cause a reduction in the polymerization productivity due to an excessive increase in the polymerization reaction time. For example, the vinyl chloride-based monomer may be further added when the polymerization conversion rate is in a range of 10% to 30%. Specifically, since coalescence/redistribution most actively occur when the polymerization conversion rate is in a range of 10% to 30%, the vinyl chloride-based monomer is further added during this period and the further added vinyl chloride-based monomer is converted to a stable form of vinyl chloride-based copolymer. Thus, an increase in the polymerization productivity may be expected and simultaneously, it is possible to control an internal morphology of polymer particles. Also, since the vinyl chloride-based monomer is further added during this period, the vinyl chloride-based monomer may fill the inside of the polymer particles due to monomer diffusion to obtain a vinyl chloride-based copolymer having a high bulk specific gravity.

Furthermore, in the preparation method, an amount of the vinyl chloride-based monomer added in the further adding of the vinyl chloride-based monomer when the polymerization conversion rate is in a range of 10% to 70%, for example, 10% to 30% may be in a range of 30 wt % to 70 wt %, for example, 50 wt % to 70 wt %, based on a total amount of the vinyl chloride-based monomer added. When the amount of the vinyl chloride-based monomer added is less than 30 wt %, the effect of increasing polymerization productivity is insignificant, and, when the amount of the vinyl chloride-based monomer added is greater than 70 wt %, it may cause problems in terms of polymerization stability due to the excess of reactor effective volume.

In the present invention, the polymerization conversion rate may be measured by using a butane tracer equipped with gas chromatography. Specifically, a polymerization conversion curve according to a ratio of the vinyl chloride-based monomer to butane with time under predetermined polymerization conditions is drawn for each polymerization condition, and the polymerization conversion rate according to each polymerization condition may be measured. The polymerization conversion rate may include a tolerance of the measurement of ±2%, and the polymerization conversion rate of 0% is meant to include a polymerization initiation point or before the initiation of the polymerization.

In addition to the vinyl chloride-based monomer and the comonomer of the cis and trans isomers of the unsaturated fatty acid ester which are used for the preparation of the vinyl chloride-based copolymer during the polymerization reaction, a vinyl-based monomer copolymerizable therewith may be further added.

The vinyl-based monomer may specifically include an olefin-based compound, vinyl esters, unsaturated nitriles, vinyl alkyl ethers, unsaturated fatty acids, or anhydrides of the unsaturated fatty acids, and any one thereof or a mixture of two or more thereof may be used. Also, the vinyl-based monomer may be used in an amount which may have an improvement effect according to the use of the corresponding vinyl-based monomer within a range that does not disturb physical and structural characteristics of the vinyl chloride-based copolymer according to the embodiment of the present invention. Specifically, the vinyl-based monomer may be used in an amount of 50 parts by weight or less based on 100 parts by weight of a total amount of the monomers used for the preparation of the vinyl chloride-based copolymer.

Also, during the polymerization reaction for the preparation of the vinyl chloride-based copolymer, an additive, such as a reaction terminator, a chain transfer agent, a pH adjuster, an antioxidant, a cross-linking agent, an antistatic agent, a scale inhibitor, and a surfactant, may be added to a polymerization system as needed before the polymerization or after the polymerization, or a portion thereof may be dividedly or continuously added during the polymerization reaction.

For example, in a case in which the reaction terminator is used, the reaction terminator may be added when the polymerization conversion rate is 80% or more, for example, in a range of 80% to 95%, and, in this case, the polymerization conversion rate may be checked through the pressure in the polymerization reactor. Specific examples of the reaction terminator may be 4-hydroxy-2,2,6,6-tetramethyl-piperidine-1-oxyl, triethylene glycol-bis-3-(3-t-butyl-4-hydroxy-5-methylphenyl)propionate, or butylated hydroxytoluene, and any one thereof or a mixture of two or more thereof may be used. Also, the reaction terminator may be used in an amount of 0.0001 part by weight to 1 part by weight based on 100 parts by weight of the total amount of the monomers used for the preparation of the vinyl chloride-based copolymer.

Furthermore, since the degree of polymerization of the vinyl chloride-based copolymer is determined by the polymerization reaction temperature and the degree of polymerization of the vinyl chloride-based copolymer is a factor that affects processing conditions and physical properties of a product, it is desirable to appropriately control the temperature during the polymerization reaction. Specifically, the polymerization temperature during the preparation of the vinyl chloride-based copolymer according to the embodiment of the present invention may be in a range of 30° C. to 80° C., for example, 30° C. to 70° C. Specifically, a vinyl chloride-based copolymer having a degree of polymerization of 2,000 or more, for example, 3,000 or more may be prepared when the polymerization temperature is 30° C. or more and less than 45° C. under a condition satisfying the above-described amount of the comonomer for polymerization, a vinyl chloride-based copolymer having a degree of polymerization of 1,700 to 1,800 may be prepared when the polymerization temperature is 40° C. or more and less than 50° C., a vinyl chloride-based copolymer having a degree of polymerization of 1,000 to 1,300 may be prepared when the polymerization temperature is in a range of 50° C. to 62° C., and a vinyl chloride-based copolymer having a degree of polymerization of less than 1,000, for example, 700 to 1,000, may be prepared when the polymerization temperature is 63° C. or more.

In order to achieve an average degree of polymerization of 1,000 to 1,500, for example, 1,000 to 1,300 while satisfying the above-described pore characteristics, the polymerization temperature may be in a range of 50° C. to 62° C., for example, 52° C. to 58° C. Also, the polymerization reaction may be performed for 2 hours to 18 hours within the above temperature range until the above-described average degree of polymerization is achieved.

As a result of the polymerization reaction, a vinyl chloride-based copolymer having the above-described structural and physical characteristics is prepared.

With respect to the method of preparing the vinyl chloride-based copolymer according to the embodiment of the present invention as described above, the polymerization productivity is excellent, and there is no possibility of the occurrence of problems due to the migration in the preparation process. Also, with respect to a vinyl chloride-based copolymer prepared according to a typical preparation method, it is in the form of a secondary particle in which primary particles are assembled, wherein it has high porosity due to pores formed between the primary particles in the secondary particle, and, as a result, it has low processability and deteriorated mechanical properties, particularly significantly deteriorated transparency. In contrast, with respect to the vinyl chloride-based copolymer prepared by the preparation method according to the present invention, since the cis and trans isomers of the unsaturated fatty acid ester used as the comonomer for the formation of the copolymer may act as an internal plasticizer to reduce or decrease voids between the primary particles, a copolymer having improved plasticity and transparency may be prepared without reduction of mechanical properties.

As a result, the use of an external plasticizer may be reduced when a molded article is prepared by using the copolymer, and the use of a conventional phthalate-based external plasticizer may be particularly reduced or replaced. Thus, the generation of environmental hormones may be reduced or prevented. Also, since the vinyl chloride-based copolymer prepared by the above preparation method may have excellent mechanical properties as well as excellent plasticity, the vinyl chloride-based copolymer may be used in various areas such as piping materials such as pipes; household goods such as toys; wallpapers; and building materials such as window frames.

Thus, according to another embodiment of the present invention, a thermoplastic resin composition including the above-described vinyl chloride-based copolymer and a molded article prepared by using the same are provided.

Hereinafter, exemplary embodiments will be described in detail to fully explain the present invention in such a manner that it may easily be carried out by a person with ordinary skill in the art to which the present invention pertains. However, the present invention may be modified in various forms and is not limited to the disclosed embodiments.

EXAMPLE 1

390 kg of deionized water was added to a reactor having an internal volume of 1 m$^3$ and equipped with a reflux condenser, 160 g of polyvinyl alcohol having a degree of hydration of 80.5%, 120 g of polyvinyl alcohol having a degree of hydration of 42.3%, and 50 g of hydroxypropyl methylcellulose were added to the reactor, and 300 kg of a vinyl chloride monomer was added thereto and stirred for 30 minutes. 30 kg of a mixture (weight ratio=90:10) of dibutyl maleate and dibutyl fumarate was added to the resulting mixture, and 60 g of di-2-ethylhexyl peroxydicarbonate and 150 g of t-butyl peroxyneodecanoate were added to initiate a reaction. The polymerization reaction was performed while a reaction temperature was maintained at 57° C. during an entire process of the polymerization reaction, and, when a pressure in the polymerization reactor reached 6.3 kg/cm$^2$ (when polymerization conversion rate was about 85%), 15 g of 4-hydroxy-2,2,6,6-tetramethyl-piperidine-1-oxyl and 90 g of triethylene glycol-bis-3-(3-t-butyl-4-hydroxy-5-methylphenyl)propionate were added as a reaction terminator. After the completion of the reaction, the unreacted monomer and a resin slurry were respectively recovered from the polymerization reactor, and the recovered resin slurry was dried in a fluidized bed dryer to obtain a vinyl chloride-based copolymer.

The polymerization conversion rate was measured by using a butane tracer equipped with gas chromatography. A polymerization conversion curve according to a ratio of the vinyl chloride monomer to butane with time under predetermined polymerization conditions was drawn for each polymerization condition, and the polymerization conversion rate according to each polymerization condition may be measured. Also, the polymerization conversion rate of 0% is meant to include a polymerization initiation point or before the initiation of the polymerization.

EXAMPLE 2

A vinyl chloride-based copolymer was obtained in the same manner as in Example 1 except that 60 kg of a mixture (weight ratio=95:5) of di(2-ethylhexyl) maleate (DOM) and di(2-ethylhexyl) fumarate (DOF) was used instead of the mixture of dibutyl maleate and dibutyl fumarate.

EXAMPLE 3

350 kg of deionized water was added to a reactor having an internal volume of 1 m$^3$ and equipped with a reflux condenser, 160 g of polyvinyl alcohol having a degree of hydration of 80.5%, 162 g of polyvinyl alcohol having a degree of hydration of 42.3%, and 45 g of hydroxypropyl methylcellulose were added to the reactor, and 270 kg of a vinyl chloride monomer was added thereto and stirred for 30 minutes. 135 kg of a mixture (weight ratio=98:2) of di(ethyldodecyl) maleate and di(ethyldodecyl) fumarate was added to the resulting mixture, and 81 g of dicumyl peroxide and 108 g of t-butyl peroxyneodecanoate were added to initiate a reaction. The polymerization reaction was performed while a reaction temperature was maintained at 52° C. during an entire process of the polymerization reaction, and, when a pressure in the polymerization reactor reached 5.7 kg/cm$^2$ (when polymerization conversion rate was about 85%), 13.5 g of 4-hydroxy-2,2,6,6-tetramethyl-piperidine-1-oxyl and 108 g of triethylene glycol-bis-3-(3-t-butyl-4-hydroxy-5-methylphenyl)propionate were added as a reaction terminator. After the completion of the reaction, the unreacted monomer and a resin slurry were respectively recovered from the polymerization reactor, and the recovered resin slurry was dried in a fluidized bed dryer to obtain a vinyl chloride-based copolymer.

EXAMPLE 4

200 kg of deionized water was added to a reactor having an internal volume of 0.5 m$^3$ and equipped with a reflux condenser, 20 g of NaOH and 200 g of sodium lauryl sulfate were added, and 150 kg of a vinyl chloride monomer was added thereto and stirred for 30 minutes. 45 kg of a mixture (weight ratio=85:15) of dihexyl maleate and dihexyl fumarate was added to the resulting mixture, and 90 g of potassium persulfate was added to perform polymerization. The reaction was performed while a polymerization temperature was maintained at 57° C., and the reaction was terminated when a pressure in the polymerization reactor reached 4.0 kg/cm$^2$. After the completion of the reaction, the unreacted monomer was recovered and removed to obtain a latex, and the resulting latex was spray-dried to obtain vinyl chloride-based copolymer powder.

EXAMPLE 5

140 kg of a vinyl chloride monomer was added to a preliminary polymerization reactor having a volume of 0.2 m$^3$ and degassed under high vacuum, and, while 85 g of t-butyl peroxyneodecanoate, as a polymerization initiator, was added and stirred, the pressure was increased to 12 K/G at 57° C. to prepare a particle nucleus having a conversion rate of 10%.

80 kg of a vinyl chloride monomer was added to a main polymerization reactor having a volume of 0.5 m$^3$, 11 kg of a mixture (weight ratio=97:3) of didecyl maleate and didecyl fumarate was added, the particle nucleus prepared in the preliminary polymerization reactor was transferred, and 200 g of 1,1,3,3-tetramethylbutyl peroxyneodecanoate, as a polymerization initiator, was added. A polymerization reaction was performed at 52° C. and a pressure of 7.5 K/G for 200 minutes while stirring the resulting mixture. 200 g of butylated hydroxytoluene was added at the end of the polymerization, the residual unreacted monomer was recovered under vacuum for 30 minutes while the stirring is maintained, and, as a result, a vinyl chloride-based copolymer was obtained.

EXAMPLE 6

A vinyl chloride-based copolymer was obtained in the same manner as in Example 2 except that the polymerization temperature during the polymerization reaction was maintained at 47° C.

EXAMPLE 7

A vinyl chloride-based copolymer was obtained in the same manner as in Example 2 except that the polymerization temperature during the polymerization reaction was maintained at 40° C.

EXAMPLE 8

A vinyl chloride-based copolymer was obtained in the same manner as in Example 3 except that the polymerization temperature during the polymerization reaction was maintained at 35° C.

EXAMPLE 9

80 kg of deionized water was added to a reactor having an internal volume of 0.2 m$^3$ and equipped with a reflux condenser, 25 g of polyvinyl alcohol having a degree of hydration of 80%, 20 g of polyvinyl alcohol having a degree of hydration of 42%, and 5 g of hydroxypropyl methylcellulose were added to the reactor, 50 kg of a vinyl chloride monomer as well as 34 kg of a mixture (weight ratio=95:5) of di(2-ethylhexyl) maleate and di(2-ethylhexyl) fumarate was added, and 30 g of di-2-ethylhexyl peroxydicarbonate was added to initiate a reaction. The reaction was performed while a reaction temperature was maintained at 57° C. during an entire process of the polymerization reaction, and the polymerization was terminated at a polymerization conversion rate of 15% (15±2%). Both of the resulting reaction product and the unreacted monomer were transferred to a secondary polymerization reactor.

300 kg of deionized water was added to a reactor having an internal volume of 0.8 m$^3$ and equipped with a reflux condenser, 60 g of polyvinyl alcohol having a degree of hydration of 80%, 48 g of polyvinyl alcohol having a degree of hydration of 42%, and 12 g of hydroxypropyl methylcellulose were added to the reactor, and, after adding 120 kg of a vinyl chloride monomer, 23 g of dicumyl peroxide and 47 g of t-butyl peroxyneodecanoate were added to initiate a reaction.

The reaction was performed while a reaction temperature was maintained at 50° C. during an entire process of the polymerization reaction, and, when a pressure in the polymerization reactor reached 6.0 kg/cm$^2$, 5 g of 4-hydroxy-2,2,6,6-tetramethyl-piperidine-1-oxyl and 35 g of triethylene glycol-bis-3-(3-t-butyl-4-hydroxy-5-methylphenyl)propionate were added as a reaction terminator. Then, the unreacted monomer was separation-recovered, and the prepared copolymer was recovered from the polymerization reactor and was then dried in a fluidized bed dryer to obtain a copolymer.

COMPARATIVE EXAMPLE 1

390 kg of deionized water was added to a reactor having an internal volume of 1 m$^3$ and equipped with a reflux condenser, 150 g of polyvinyl alcohol having a degree of hydration of 78.5%, 100 g of polyvinyl alcohol having a degree of hydration of 40.7%, and 30 g of hydroxypropyl methylcellulose were collectively added to the reactor. 300 kg of a vinyl chloride monomer was added to the reactor, 30 g of di-2-ethylhexyl peroxydicarbonate and 120 g of t-butyl peroxyneodecanoate were added, and a polymerization reaction was then performed while a polymerization temperature was maintained at 57° C. When a pressure in the polymerization reactor reached 6.3 kg/cm$^2$, 15 g of 4-hydroxy-2,2,6,6-tetramethyl-piperidine-1-oxyl and 60 g of triethylene glycol-bis-3-(3-t-butyl-4-hydroxy-5-methylphenyl)propionate were added as a reaction terminator, and the unreacted monomer and a resin slurry were respectively recovered from the polymerization reactor. Thereafter, the recovered slurry was dried in a fluidized bed dryer to obtain a vinyl chloride homopolymer.

COMPARITIVE EXAMPLE 2

A vinyl chloride homopolymer was obtained in the same manner as in Comparative Example 1 except that the polymerization temperature in Comparative Example 1 was changed to 64° C.

COMPARITIVE EXAMPLE 3

A vinyl chloride homopolymer was obtained in the same manner as in Comparative Example 1 except that the polymerization temperature in Comparative Example 1 was changed to 67° C.

COMPARATIVE EXAMPLES 4-1 to 4-8

Vinyl chloride-based polymers were obtained in the same manner as in Comparative Example 1 except that dioctyl phthalate (DOP), as an external plasticizer, was added to 100 parts by weight of the vinyl chloride-based polymer polymerized in Comparative Example 1 in various amounts as listed in the following Table 1 and reacted.

TABLE 1

|  | Amount of DOP (parts by weight) |
| --- | --- |
| Comparative Example 4-1 | 10 |
| Comparative Example 4-2 | 20 |
| Comparative Example 4-3 | 30 |
| Comparative Example 4-4 | 40 |
| Comparative Example 4-5 | 50 |
| Comparative Example 4-6 | 60 |
| Comparative Example 4-7 | 70 |
| Comparative Example 4-8 | 80 |

COMPARITIVE EXAMPLE 5

A vinyl chloride-based polymer was obtained in the same manner as in Comparative Example 4-4 except that, instead of DOP in Comparative Example 4-4, di(2-ethylhexyl) maleate (DEHM) was used as an external plasticizer in an amount of 40 parts by weight based on 100 parts by weight of the vinyl chloride-based polymer.

COMPARITIVE EXAMPLE 6

A vinyl chloride-based polymer was obtained in the same manner as in Example 1 except that a mixture (weight ratio=50:50) of dibutyl maleate and dibutyl fumarate was used.

COMPARITIVE EXAMPLE 7

A vinyl chloride-based polymer was obtained in the same manner as in Example 1 except that dibutyl fumarate was used alone instead of using a mixture of dibutyl maleate and dibutyl fumarate.

COMPARATIVE EXAMPLE 8

A vinyl chloride-based polymer was obtained in the same manner as in Example 1 except that 6 kg of a mixture (weight ratio=90:10) of dibutyl maleate and dibutyl fumarate was used.

COMPARATIVE EXAMPLE 9

A vinyl chloride-based polymer was obtained in the same manner as in Example 1 except that 200 kg of a mixture (weight ratio=90:10) of dibutyl maleate and dibutyl fumarate was used.

EXPERIMENTAL EXAMPLE 1

Infrared (IR) spectroscopy was performed on the vinyl chloride-based copolymer prepared in Example 1 and the vinyl chloride homopolymer prepared in Comparative Example 1. Also, in order to identify whether a comonomer in the vinyl chloride-based copolymer prepared in Example 1 was bonded or not, IR spectroscopy was also performed on an unsaturated dicarboxylic acid ester including dibutyl maleate and dibutyl fumarate which was used in Example 1. The results thereof are presented in FIG. 1.

As illustrated in FIG. 1, from the result of the IR spectroscopy of the vinyl chloride-based copolymer prepared in Example 1, a C═O stretching peak and a C═C stretching peak, which were observed by the IR spectroscopy of the unsaturated dicarboxylic acid ester, were observed. In contrast, such peaks were not observed in Comparative Example 1. Thus, it may be confirmed that the comonomer used in the preparation of the copolymer of Example 1 was copolymerized.

EXPERIMENTAL EXAMPLE 2

The vinyl chloride-based copolymer prepared in Example 2 and the vinyl chloride homopolymer prepared in Comparative Example 1 were observed with a transmission electron microscope (JEM-1400, JEOL). In this case, observation samples were treated under the following conditions: each polymer prepared in Example 2 and Comparative Example 1 was embedded in epoxy at room temperature (23±5° C.) for 1 day, trimming and sectioning were performed at room temperature, $RuO_4$ vapor staining was performed for 1 hour, and the stained polymer was impregnated in a para film to prepare the samples.

The results thereof are presented in FIGS. 2A to 3B.

Figure 2A:
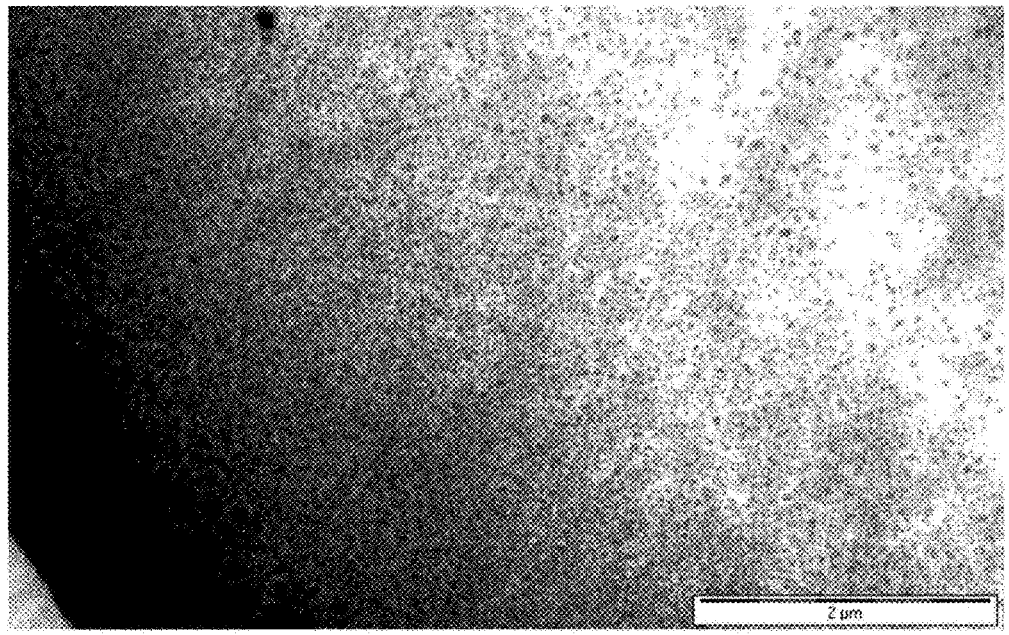
FIG. 2A is a transmission electron microscope (TEM) image of a vinyl chloride-based copolymer prepared in Example 2.
Figure 2B:
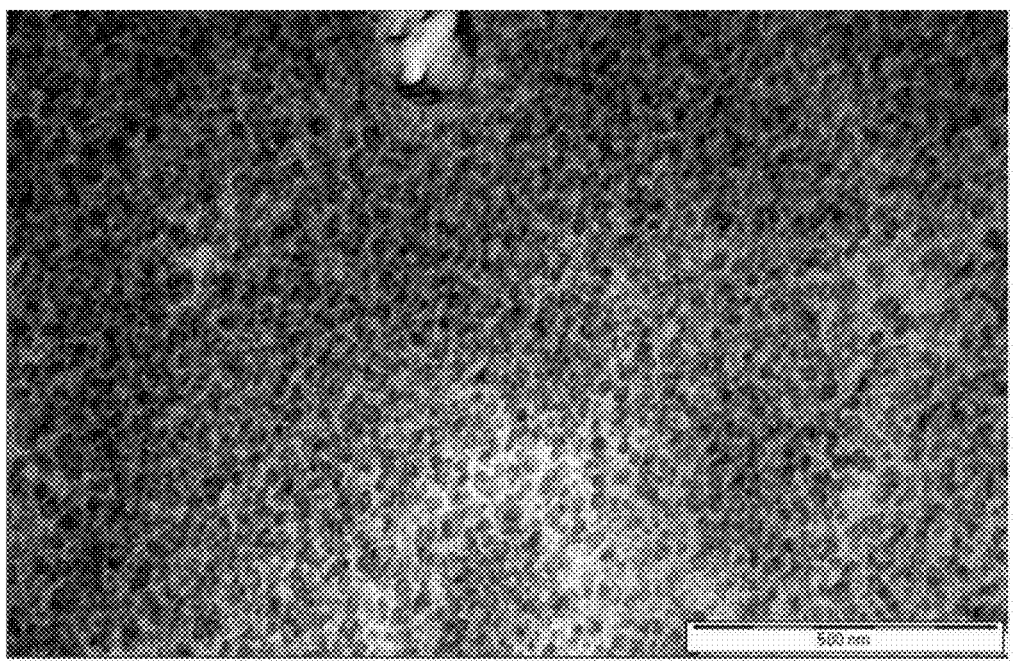
FIG. 2B is an enlarged view of the portion of FIG. 2A.

As illustrated in FIGS. 2A and 2B, with respect to the vinyl chloride-based copolymer prepared in Example 2, it may be confirmed that di(2-ethylhexyl) maleate and di(2-ethylhexyl) fumarate (black dots) were dispersed and included in a vinyl-based matrix, and thus, it may be understood that the vinyl chloride-based copolymer was well prepared.

Figure 3A:
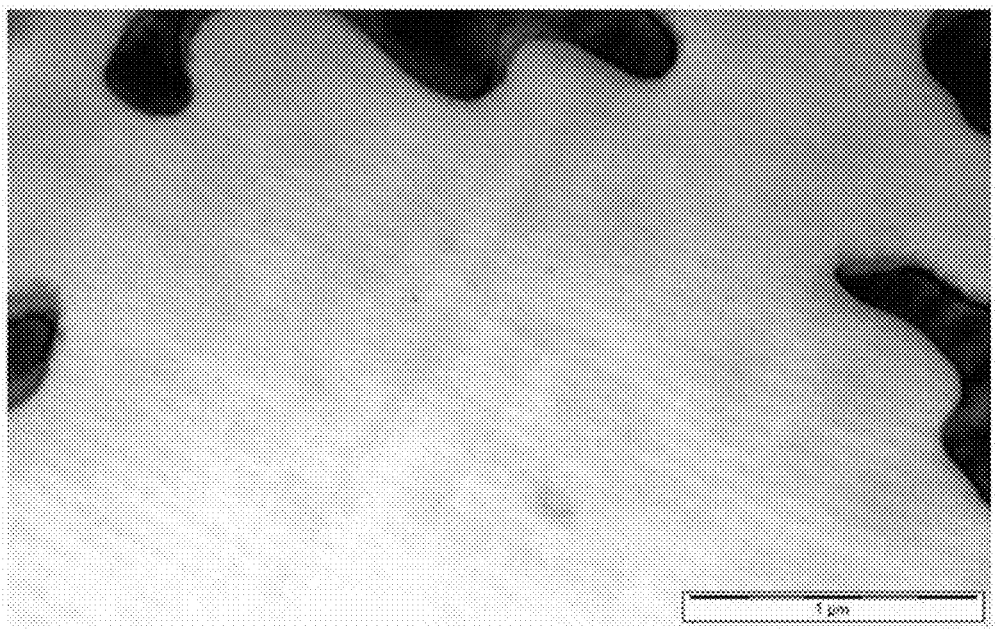
FIG. 3A is a TEM image of a vinyl chloride-based polymer prepared in Comparative Example 1.
Figure 3B:
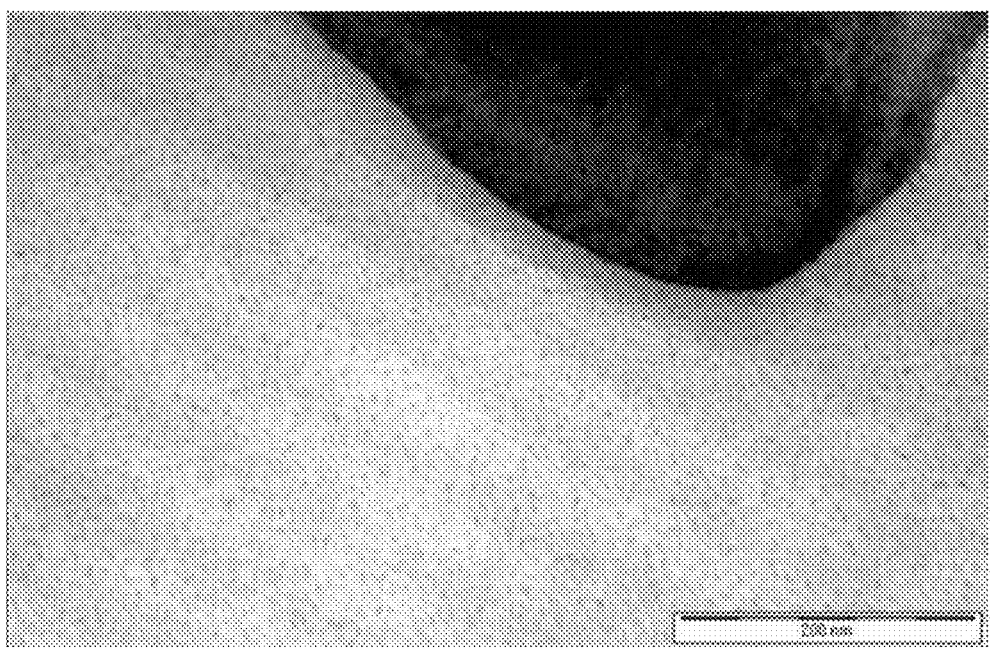
FIG. 3B is an enlarged view of the portion of FIG. 3A.

As illustrated in FIGS. 3A and 3B, with respect to the vinyl chloride polymer prepared in Comparative Example 1, a vinyl-based matrix was only identified.

EXPERIMENTAL EXAMPLE 3

Figure 4:
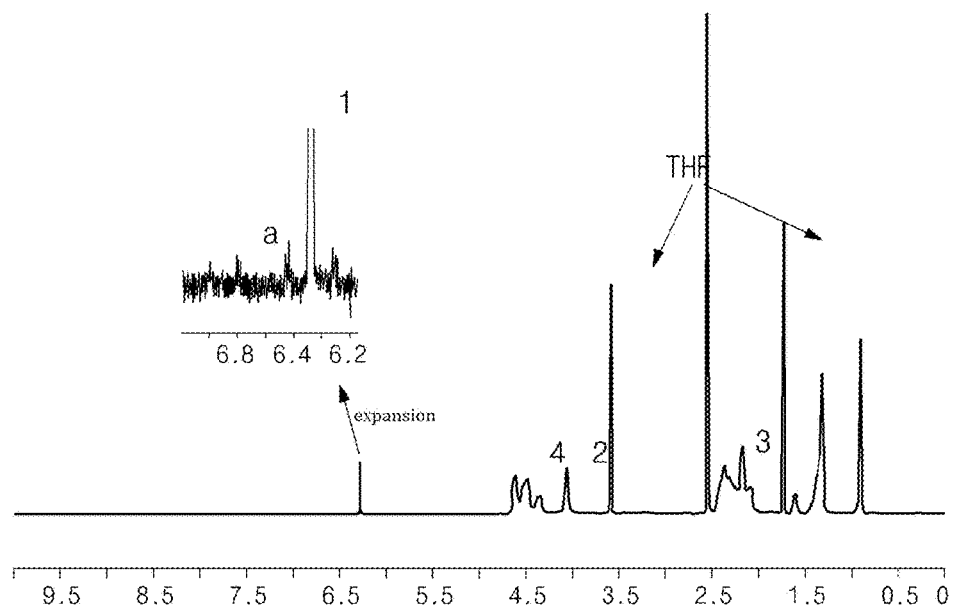
FIG. 4 is an image of a vinyl chloride-based polymer prepared in Example 9 observed by nuclear magnetic resonance (NMR)
Figure 5A:
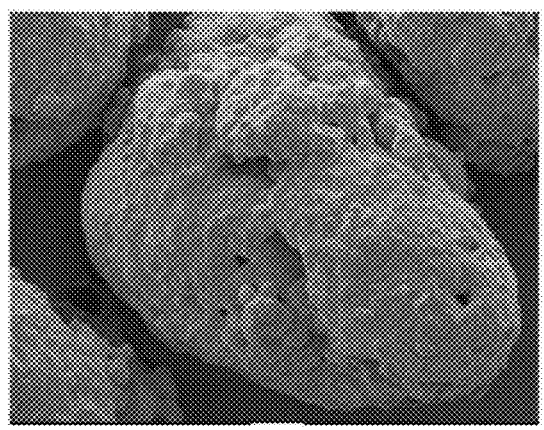
FIGS. 5A and 5B are scanning electron microscope (SEM) images of a surface and a cross section of the vinyl chloride-based copolymer prepared in Example 1 (magnification of FIG. 5A=×400, magnification of FIG. 5B=×700)
Figure 5B:
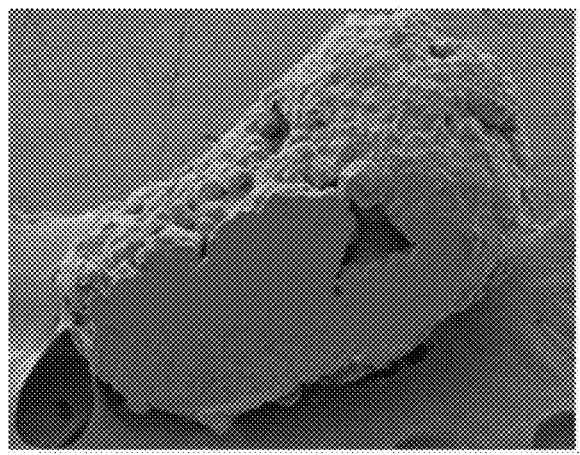
Figure 6A:
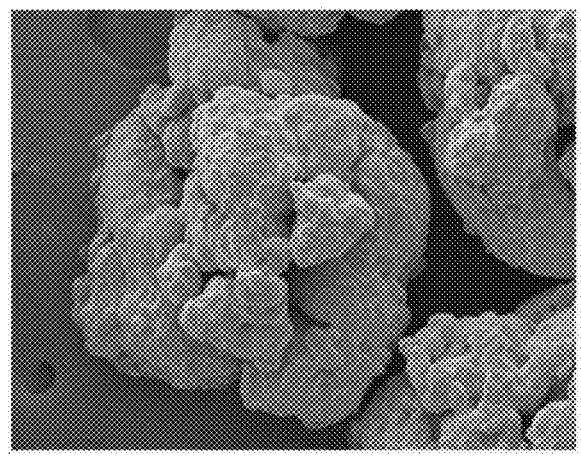
FIGS. 6A and 6B are SEM images of a surface and a cross section of the vinyl chloride-based copolymer prepared in Example 2 (magnification of FIG. 6A=×400, magnification of FIG. 6B=×700)
Figure 6B:
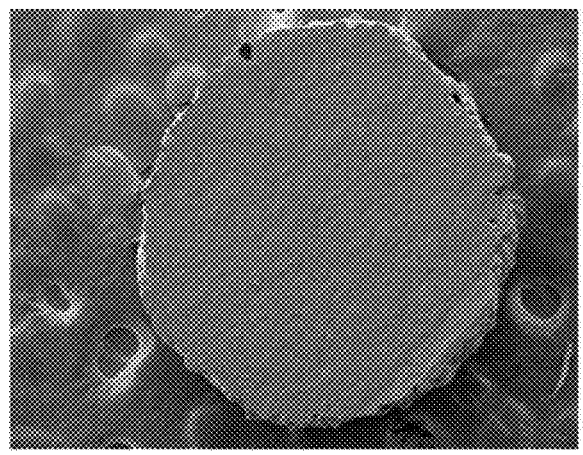
Figure 7A:
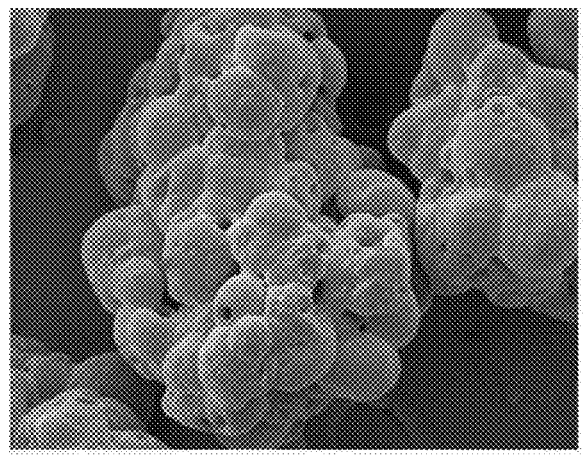
FIGS. 7A and 7B are SEM images of a surface and a cross section of a vinyl chloride-based copolymer prepared in Example 3 (magnification of FIG. 7A=×400, magnification of FIG. 7B=×700)
Figure 7B:
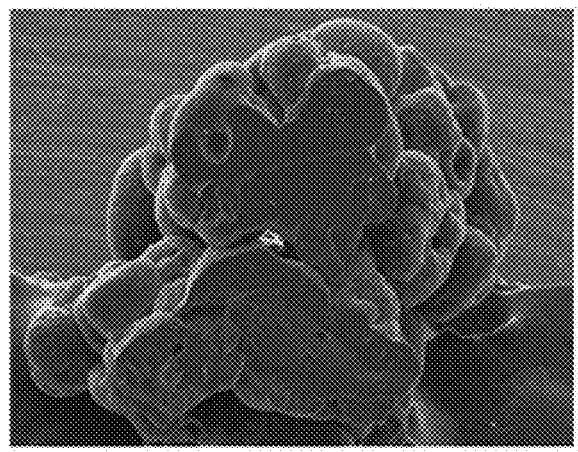
Figure 8:
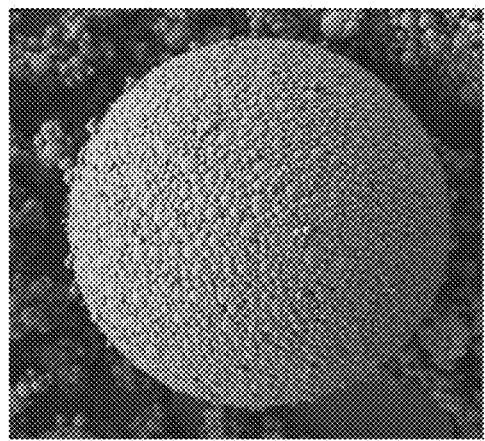
FIG. 8 is a SEM image of a surface of a vinyl chloride-based copolymer prepared in Example 4 (magnification of FIG. 8=×2,500)
Figure 9A:
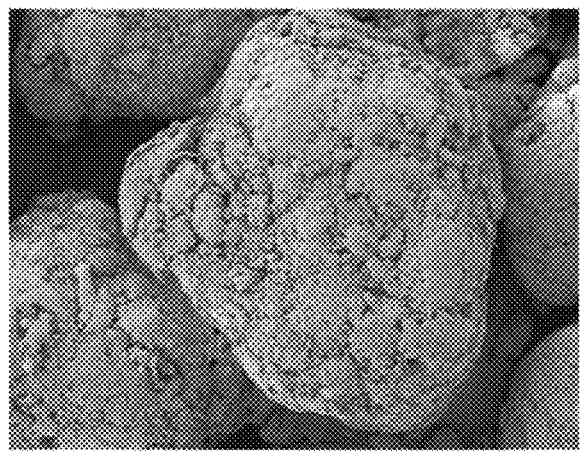
FIGS. 9A and 9B are SEM images of a surface and a cross section of a vinyl chloride-based copolymer prepared in Example 5 (magnification of FIG. 9A=×400, magnification of FIG. 9B=×700)
Figure 9B:
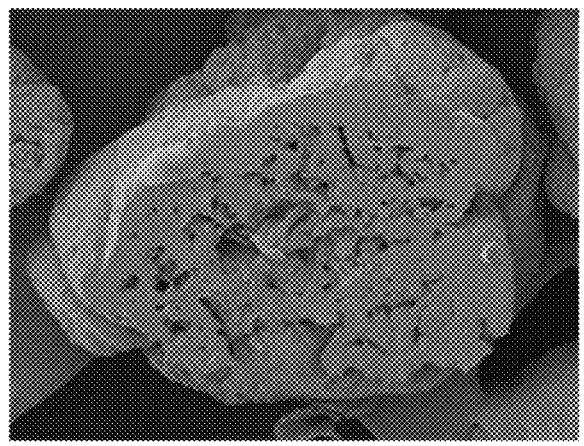

1H NMR analysis was performed on the copolymer prepared in Example 9 using an Agilent 500 MHz/ONE probe, and the results thereof are presented in FIG. 4. In this case, tetrahydrofuran (THF) was used as an analytical solvent.

In FIG. 4, 1, 2, a, and b respectively denote peaks of functional groups of 1, 2, a, and b indicated in DOM and DOF of the following structures.

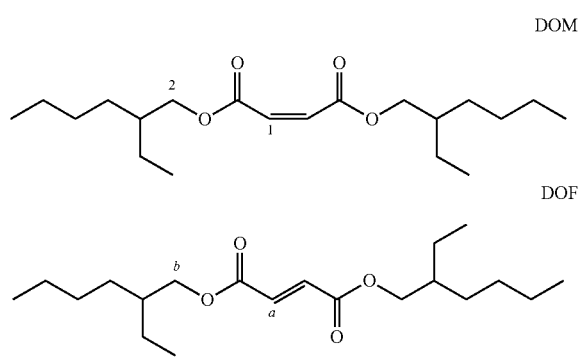

As a result of the analysis, peaks of DOM and DOF were clearly observed. From these results, it may be confirmed that DOM and DOF used in the preparation of the polymer were bonded to the prepared butadiene copolymer as a comonomer and a content ratio (weight basis) of DOM:DOF was 96:4.

EXPERIMENTAL EXAMPLE 4

ALS/GC-MSD/FID analysis was performed on the copolymers prepared in Examples 1 to 9.

Specifically, 0.2 g of each of the copolymers prepared in Examples 1 to 9 was weighed and dissolved in 10 ml of THF, and the solution was then precipitated with 30 ml of methanol. Thereafter, sonication was performed to extract the additives, and each supernatant was then taken and filtered (filter used: 0.2 μm disc syringe filter). Each sample thus obtained was analyzed by using ALS (Auto liquid Sampler)/GC-MSD (gas chromatography-mass spectrometry) (Agilent 6890N GC-MSD)/FID (Flame Ionization Detector, Agilent technologies). The results thereof are presented in Table 2 below.

TABLE 2

| (Weight ratio) | Amount of cis isomer of unreacted fatty acid ester-derived repeating unit | Amount of trans Isomer of unreacted fatty acid ester-derived repeating unit |
|---|---|---|
| Example 1 | 91.43 | 6.75 |
| Example 2 | 96.57 | 1.92 |
| Example 3 | 98.15 | 1.09 |
| Example 4 | 89.44 | 8.92 |
| Example 5 | 97.21 | 1.65 |
| Example 6 | 96.49 | 1.95 |
| Example 7 | 96.36 | 2.06 |
| Example 8 | 96.85 | 1.77 |
| Example 9 | 96.45 | 1.99 |
| Comparative Example 6 | 57.28 | 42.72 |
| Comparative Example 7 | — | 100 |

As the result of experiment, it may be confirmed that cis and trans fatty acid ester-derived repeating units were included in the copolymers prepared in Examples 1 to 9 in a mixing weight ratio of 80:20 to 99:1. Also, from the high conversion rate, it may be confirmed that the trans unsaturated fatty acid ester had better formability of copolymer with the vinyl chloride monomer than the cis unsaturated fatty acid ester.

EXPERIMENTAL EXAMPLE 5

A weight-average molecular weight (Mw), a number-average molecular weight (Mn), and polydispersity were respectively measured for the copolymers prepared in Examples 1 to 9 and Comparative Examples 1, 6, and 7.

Specifically, Mw and Mn were respectively determined by using Waters 2414 Refractive Index Detector, Waters 1525 Binary HPLC Pump, and Waters 717 Autosampler, and the polydispersity was determined from a ratio of Mw/Mn. The results thereof are presented in Table 3 below.

TABLE 3

| | Mw (g/mol) | Mn (g/mol) | Polydispersity (Mw/Mn) |
|---|---|---|---|
| Example 1 | 134,384 | 68,946 | 1.9491 |
| Example 2 | 123,265 | 64,667 | 1.9061 |
| Example 3 | 94,118 | 50,326 | 1.8702 |
| Example 4 | 109,302 | 58,107 | 1.8810 |

TABLE 3-continued

|  | Mw (g/mol) | Mn (g/mol) | Polydispersity (Mw/Mn) |
|---|---|---|---|
| Example 5 | 181,337 | 91,793 | 1.9755 |
| Example 6 | 235,081 | 71,755 | 1.9955 |
| Example 7 | 273,875 | 112,868 | 1.9514 |
| Example 8 | 243,583 | 135,893 | 2.0154 |
| Example 9 | 163,038 | 84,386 | 1.9321 |
| Comparative Example 1 | 143,190 | 71,395 | 2.0056 |
| Comparative Example 6 | 127,411 | 64,220 | 1.9840 |
| Comparative Example 7 | 125,657 | 63,401 | 1.9819 |

As illustrated in Table 3, the weight-average molecular weight, the number-average molecular weight (Mn), and the polydispersity were changed according to the polymerization method, the polymerization temperature, the amount of the comonomer used, and whether the comonomer was used or not during the preparation of the vinyl chloride-based copolymer. For example, when the copolymers of Examples 1 to 3 and Comparative Example 1, which were prepared by suspension polymerization under similar polymerization temperature conditions, were compared, the copolymers of Examples 1 to 3, in which the comonomer was used, had lower Mn, Mw, and polydispersity than the copolymer of Comparative Example 1 in which the comonomer was not used. The reason for this is that there was a higher tendency for the comonomer to be bonded to the vinyl chloride monomer instead of being bonded to each other during the polymerization, and, from these results, it may be understood that plasticizing performance of the vinyl chloride-based copolymer prepared by the use of the comonomer may be further improved.

Also, the vinyl chloride-based copolymer of Example 1, in which the mixture of the cis and trans isomers of the unsaturated fatty acid ester was used under the same polymerization condition, but the mixing ratio condition of the cis and trans isomers of the present invention was satisfied, had similar levels of Mw and Mn to Comparative Examples 6 and 7 in which the mixing ratio condition was not satisfied, but it may be understood that the polydispersity was reduced to have better plasticizing performance.

Furthermore, as in Examples 1 and 2, the polydispersities were reduced according to an increase in the amount of the comonomer added under the same polymerization condition, and, as in Examples 2, 6, and 7, or Examples 3 and 8, the Mw, Mn, and polydispersity were reduced together as the polymerization temperature was increased.

EXPERIMENTAL EXAMPLE 6

The vinyl chloride-based copolymers prepared in Examples 1 to 5 and Comparative Examples 1, 6, and 7 were observed with a scanning electron microscope (SEM). The results thereof are presented in FIGS. 5A to 10B.

As illustrated in FIGS. 5A to 9B, the vinyl chloride-based copolymers according to Examples 1 to 5 were in the form of a secondary particle in which smaller primary particles were agglomerated like a bunch of grapes, and a degree of agglomeration was increased as the amount of the comonomer was higher during the preparation of the copolymer. Also, as confirmed from cross-sectional images, fine pores were hardly observed in the secondary particle.

Figure 10A:
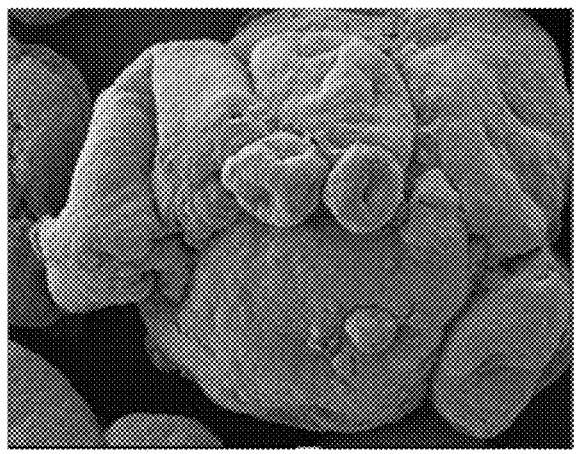
FIGS. 10A and 10B are SEM images of a surface and a cross section of the vinyl chloride homopolymer prepared in Comparative Example 1 (magnification of FIG. 10A=×400, magnification of FIG. 10B=×1,000).
Figure 10B:
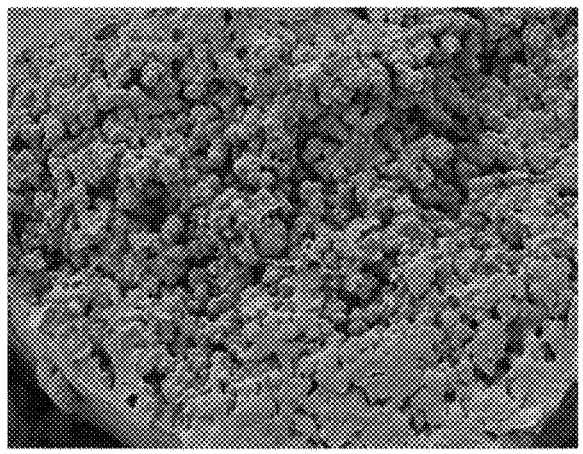

In contrast, as illustrated in FIGS. 10A and 10B, it may be confirmed that, with respect to the vinyl chloride-based polymer of Comparative Example 1, a single large particle was formed by the agglomeration of many large sub-grains, and a plurality of pores was formed between the sub-grains.

EXPERIMENTAL EXAMPLE 7

Surface void ($P_{inter}$), accessible intravoid ($P_{acc}$), and inaccessible intravoid ($P_{inacc}$) of the copolymers prepared in Examples 1 to 9 and Comparative Examples 1 to 3 and 6 to 9 were respectively measured from amounts of mercury intruded into copolymer particles by using a mercury porosimeter (Auto Pore IV 9520, Micrometrics Instrument Corporation) and a total pore area, an average pore diameter (4V/A), and porosity were respectively calculated from the measurement results. The results thereof are presented in Table 4 below.

TABLE 4

|  | Example 1 | Example 2 | Example 3 | Example 4 | Example 5 | Example 6 | Example 7 | Example 8 | Example 9 |
|---|---|---|---|---|---|---|---|---|---|
| Surface void (ml/g) | 0.1801 | 0.0916 | 0.0514 | 0.0701 | 0.3287 | 0.0965 | 0.0872 | 0.0533 | 0.094 |
| Accessible intravoid (ml/g) | 0.0823 | 0.0578 | 0.0161 | 0.0323 | 0.1006 | 0.0659 | 0.0583 | 0.0158 | 0.0438 |
| Inacessible intravoid (ml/g) | 0.0125 | 0.0115 | 0.0094 | 0.0103 | 0.0142 | 0.0122 | 0.0108 | 0.0101 | 0.011 |
| Total intrusion volume of mercury (ml/g) | 0.2749 | 0.1609 | 0.0769 | 0.1127 | 0.4435 | 0.1746 | 0.1563 | 0.0792 | 0.1488 |
| Total pore area ($m^2/g$) | 20.125 | 21.379 | 23.853 | 22.798 | 18.481 | 20.973 | 20.98 | 24.369 | 21.565 |
| Average pore diameter (nm) | 54.6 | 30.1 | 12.9 | 19.8 | 96 | 33.3 | 29.8 | 13 | 27.6 |
| Porosity | 25.04 | 19.244 | 13.226 | 16.185 | 34.877 | 20.173 | 19.088 | 13.532 | 17.425 |

TABLE 4-continued (%)

|  | Comparative Example 1 | Comparative Example 2 | Comparative Example 3 | Comparative Example 6 | Comparative Example 7 | Comparative Example 8 | Comparative Example 9 |
|---|---|---|---|---|---|---|---|
| Surface void (ml/g) | 0.7915 | 0.7355 | 0.6863 | 0.4845 | 0.5063 | 0.7018 | ND |
| Accessible intravoid (ml/g) | 0.254 | 0.1736 | 0.1262 | 0.1217 | 0.2824 | 0.2674 | ND |
| Inacessible intravoid (ml/g) | 0.0307 | 0.0693 | 0.0326 | 0.0224 | 0.0247 | 0.0253 | ND |
| Total intrusion volume of mercury (ml/g) | 10.762 | 0.9784 | 0.8451 | 0.6286 | 0.8134 | 0.9945 | ND |
| Total pore area (m²/g) | 17.858 | 17.506 | 19.179 | 22.446 | 24.012 | 21.655 | ND |
| Average pore diameter (nm) | 241.1 | 223.6 | 176.3 | 112 | 135.5 | 183.7 | ND |
| Porosity (%) | 60.172 | 55.36 | 51.634 | 47.962 | 51.563 | 48.947 | ND |

In Table 4, ND denotes that the measurement was not performed.

Also, the total intrusion volume ($P_{total}$) of mercury in Table 4 was calculated by the following Equation 1.

$$P_{total} = P_{inter} + P_{acc} + P_{inacc} \quad [\text{Equation 1}]$$

In Equation 1, $P_{inacc}$ is a sum of an amount of mercury adsorbed in pores in the primary particles and an amount of intruded mercury which was not adsorbed in the vinyl chloride copolymer.

As illustrated in Table 4, the vinyl chloride-based copolymers of Examples 1 to 9, in which the mixture of the cis and trans isomers of the unsaturated fatty acid ester was used as a comonomer, had an average pore diameter of 100 nm or less and a porosity of 40 vol % or less, wherein it may be confirmed that the vinyl chloride-based copolymers of Examples 1 to 9 included finer pores with significantly lower porosity in comparison to Comparative Example 1 in which the comonomer was not used, Comparative Examples 2 and 3 in which the external plasticizer was used, Comparative Examples 6 and 7, in which the mixture of the cis and trans isomers of the unsaturated fatty acid ester was used, but the mixing ratio did not satisfy the mixing ratio condition of the present invention, and the vinyl chloride-based copolymer of Comparative Example 8 in which the mixing ratio condition of the mixture of the cis and trans isomers of the unsaturated fatty acid ester was satisfied, but the mixture content condition of the cis and trans isomers of the unsaturated fatty acid ester was not satisfied. Also, with respect to Comparative Example 9, in which the mixing ratio condition of the mixture of the cis and trans isomers of the unsaturated fatty acid ester was satisfied, but the amount of the mixture of the cis and trans isomers of the unsaturated fatty acid ester was excessively high, normal polymerization was not performed and a large particle was formed.

EXPERIMENTAL EXAMPLE 8

A cold plasticizer absorption (CPA) was measured for the copolymers of Examples 1 to 5 and Comparative Examples 1 to 3, 6, and 7.

Specifically, the cold plasticizer absorption was measured according to ASTM D2396 and ISO 4574 at 3,900 rpm and 20° C. by using a cold plasticizer absorption measurement instrument (Continent 512-R by Hanil Science Industrial Co., Ltd.). The results thereof are presented in Table 5 below.

TABLE 5

|  | Example 1 | Example 2 | Example 3 | Example 4 | Example 5 | Comparative Example 1 | Comparative Example 2 | Comparative Example 3 | Comparative Example 6 | Comparative Example 7 |
|---|---|---|---|---|---|---|---|---|---|---|
| CPA (%) | 4.70 | 3.88 | 1.87 | 2.32 | 6.89 | 24.3 | 19.0 | 14.2 | 14.0 | 14.3 |

In general, with respect to a polymer having a low degree of polymerization prepared at a high polymerization temperature, CPA is low. As illustrated in Table 5, the copolymers of Comparative Examples 1 to 3 exhibited significantly higher cold plasticizer absorptions than the copolymers of Examples 1 to 5 despite the fact that the polymerization temperatures were equal to or better than those of Examples 1 to 5 (57° C. to 67° C.). Specifically, the copolymers of Comparative Examples 1 to 3 had a cold plasticizer absorption of a minimum of 14.0% or more, but the copolymers of Examples 1 to 5 according to the present invention had a cold plasticizer absorption of a maximum of 6.89% which was reduced by more than half. Also, Example 1, which satisfied the mixing ratio condition of the cis and trans isomers of the unsaturated fatty acid ester even if it was polymerized under the same polymerization condition, had a cold plasticizer absorption that was significantly reduced in comparison to Comparative Examples 6 and 7 which did not satisfy the mixing ratio condition.

Furthermore, a K value was measure for each of the copolymers prepared in Examples 1, 4, and 9 and Comparative Example 7.

Specifically, the K value was measured in a sodium chloride solution with a concentration of 5 wt % at a temperature of 25° C., a polymer concentration of 0.5 wt %, and a pH of 7.0 according to an article [H. Fikentscher, Cellulose Chemie, Vol. 13, 58-64 and 71-74 (1932)]. The results thereof are presented in Table 6 below.

TABLE 6

|  | Example 1 | Example 4 | Example 9 | Comparative Example 7 |
|---|---|---|---|---|
| K value | 65 | 60 | 71 | 75 |

As the result of experiment, since the vinyl chloride-based copolymers of Examples 1, 4, and 9, in which the mixture of the cis and trans isomers of the unsaturated fatty acid was used as a comonomer and the mixing ratio condition of the cis and trans isomers of the unsaturated fatty acid was satisfied, had lower K values than Comparative Example 7 in which the mixing ratio condition was not satisfied, it may be confirmed that the vinyl chloride-based copolymers of Examples 1, 4, and 9 had better soft characteristics and plasticizing performance.

Also, a glass transition temperature (Tg) was measured for each of the copolymers prepared in Examples 3 and 4 and Comparative Examples 1 and 4-5.

Specifically, the Tg was measured by using a differential scanning calorimeter (DSC) 2920 manufactured by TA Instruments, and the results thereof are presented in Table 7 below.

TABLE 7

|  | Example 3 | Example 4 | Comparative Example 1 | Comparative Example 4-5 |
|---|---|---|---|---|
| Tg (° C.) | −35 | −24 | 83 | −10 |

As the result of experiment, the vinyl chloride-based copolymers of Examples 3 and 4, in which the mixture of the cis and trans isomers of the unsaturated fatty acid was used as a comonomer, had a significantly lower Tg than Comparative Example 1, in which the comonomer was not used, and also had a lower Tg than Comparative Example 4-5 in which the external plasticizer was used. Accordingly, it may be confirmed that the vinyl chloride-based copolymers of Examples 3 and 4, in which the comonomer was used, had better plasticizing performance.

PREPARATION EXAMPLE 4 parts by weight of a tin-based heat stabilizer (MT800, SONGWON Industrial Co., Ltd.), 1 part by weight of a processing aid (PA-910, LG Chem), 5 parts by weight of an impact modifier (MB872, LG Chem), 0.5 part by weight of a lubricant (SL63, LG Chem) were added to 100 parts by weight of each of the vinyl chloride-based copolymers prepared in Examples 1 to 9, the mixture was kneaded at 185° C. for 3 minutes by using a roll-mill, and a 0.5 mm thick sheet was then prepared. Each sheet prepared was cut into a predetermined size and put in a 3 cm thick mold, and each compressed sheet was prepared by preheating for 2 minutes at 185° C., low-pressure heating for 3 minutes, and high-pressure cooling for 2 minutes by using a press.

Compressed sheets were also prepared in the same manner from the vinyl chloride-based copolymers prepared in Comparative Examples 1 to 7.

EXPERIMENTAL EXAMPLE 9

Hardness characteristics (Rockwell) of the compressed sheets including the copolymers prepared in Examples 1 to 5 and Comparative Examples 1, 4-1 to 4-7, and 5 to 7 were evaluated according to ASTM D785-65. The results thereof are presented in Table 8 below.

TABLE 8

|  | External plasticizer amount (parts by weight) | DOP equivalent amount (%) | Hardness (HS) |
|---|---|---|---|
| Example 1 | — | 21.08 | 90.23 |
| Example 2 | — | 42.87 | 78.93 |
| Example 3 | — | 98.29 | 52.17 |
| Example 4 | — | 60.46 | 70.30 |
| Example 5 | — | 12.88 | 102.87 |
| Comparative Example 1 | — | — | 110.20 |
| Comparative Example 4-1 | 10 | — | 107.25 |
| Comparative Example 4-2 | 20 | — | 90.81 |
| Comparative Example 4-3 | 30 | — | 85.83 |
| Comparative Example 4-4 | 40 | — | 79.67 |
| Comparative Example 4-5 | 50 | — | 75.17 |
| Comparative Example 4-6 | 60 | — | 71.17 |
| Comparative Example 4-7 | 70 | — | 65.21 |
| Comparative Example 5 | 40 | — | 79.43 |
| Comparative Example 6 | — | 14.67 | 93.68 |
| Comparative Example 7 | — | 11.61 | 95.35 |

In Table 8, the amount of the external plasticizer is a relative weight ratio of DOP or DEHM represented based on 100 parts by weight of the vinyl chloride polymer of Comparative Example 1, and the DOP equivalent amount is a value in which the amount of the cis and trans isomers of the unsaturated fatty acid ester-derived repeating units included in the vinyl chloride-based copolymers prepared in Examples 1 to 5 is converted into DOP.

As the result of experiment, although the external plasticizer was not separately added, the vinyl chloride-based copolymers prepared in Examples 1 to 5 had lower hardness than the comparative examples. In particular, when comparing Example 5 and DOP10 of Comparative Example 4-1, Example 1 and DOP20 of Comparative Example 4-2; Example 2 and DOP40 of Comparative Example 4-4; and Example 4 and DOP60 of Comparative Example 4-6 in which the DOP equivalent weight of the isomers-derived repeating units in the copolymers of Examples 1 to 5 and the amount of the external plasticizer added to the polymer of Comparative Example 1 were equivalent; since the copolymers according to the examples had lower hardness, it may be confirmed that the copolymers according to the examples had better plasticizing performance.

EXPERIMENTAL EXAMPLE 10

Mechanical properties, such as tensile stress, strain, and E-modulus, of the compressed sheets including the vinyl chloride copolymers prepared in Examples 1 to 5 and Comparative Examples 4-4, 4-6, 4-8, and 5 to 7 were evaluated according to ASTM D638. The results thereof are presented in Table 9 below.

TABLE 9

|  | Tensile strength (MPa) | Strain (%) | E-modulus (N/cm$^2$) |
|---|---|---|---|
| Example 1 | 31.73 | 194.9 | 4339.96 |
| Example 2 | 13.79 | 357.83 | 3439.82 |
| Example 3 | 7.43 | 706.63 | 418.19 |
| Example 4 | 11.12 | 549.73 | 823.38 |
| Example 5 | 41.94 | 40.25 | 5163.94 |
| Comparative Example 4-4 | 11.95 | 490.88 | 869.01 |
| Comparative Example 4-6 | 9.17 | 681.4 | 316.03 |
| Comparative Example 4-8 | 7.85 | 834.3 | 152.12 |
| Comparative Example 5 | 11.42 | 597.15 | 777.35 |

In general, when a plasticizer is added during the preparation of a vinyl chloride-based polymer, mechanical properties, such as tensile strength, elastic modulus, and strain, are reduced and plasticity, such as E-modulus, is increased. As the result of experiment, the copolymers of Examples 1 to 5 exhibited higher tensile strength as well as better plasticizing performance than the copolymers of the comparative examples, in which the same amount of the external plasticizer was used, due to an internal plasticizing effect of the mixture of the cis and trans isomers of the unsaturated fatty acid ester used as a comonomer. Accordingly, it may be confirmed that the copolymers of Examples 1 to 5 had more improved plasticizing performance and mechanical properties than the comparative examples in which the external plasticizer was used. Particularly, the copolymer of Example 5, which was bulk-polymerized by using didecyl maleate and didecyl fumarate, as a comonomer, in a mixing weight ratio of 97:3, exhibited best mechanical properties as well as excellent plasticizing performance due to the small amount of the comonomer added (amount of the comonomer=5 wt %). In contrast, with respect to the copolymer of Example 3 which was suspension-polymerized by mixing and using di(ethyldodecyl) maleate and di(ethyldodecyl) fumarate in a mixing weight ratio of 98:2, tensile strength and E-modulus were slightly reduced in comparison to those of Examples 1 and 2 prepared under similar polymerization conditions due to an increase in the amount of the comonomer (amount of the comonomer=33.3 wt %) with respect to the vinyl chloride-based monomer, but strain was increased by 700% or more.

EXPERIMENTAL EXAMPLE 11

Transparency was measured for each of the compressed sheets respectively including the vinyl chloride-based copolymers prepared in Example 1 and Comparative Examples 6 and 7 by using a haze-gard plus instrument (BYK-Gardener). The results thereof are presented in Table 10 below. The results show that the higher the value was, the better the transparency was.

TABLE 10

|  | Transparency |
|---|---|
| Example 1 | 82.4 |
| Comparative Example 6 | 65.2 |
| Comparative Example 7 | 31.8 |

As the result of experiment, the compressed sheet including the vinyl chloride-based copolymer of Example 1, which was prepared by mixing and using dibutyl maleate and dibutyl fumarate, as a comonomer, in an optimum mixing ratio, exhibited significantly improved transparency in comparison to the compressed sheet including the vinyl chloride-based copolymer of Comparative Example 6, in which dibutyl maleate and dibutyl fumarate were mixed and used as a comonomer, but the optimum mixing ratio condition was not satisfied, and the compressed sheet including the vinyl chloride-based copolymer of Comparative Example 7 in which dibutyl fumarate was used alone.

The invention claimed is:

1. A vinyl chloride-based copolymer as a secondary particle in which primary particles are assembled,
    wherein the vinyl chloride-based copolymer has an average pore diameter of 100 nm or less and a porosity of 40 vol % or less,
    comprises 65 wt % to 97 wt % of a vinyl chloride monomer-derived repeating unit based on 100 wt % of the vinyl chloride-based copolymer; and 3 wt % to 35 wt % of cis and trans isomers of an unsaturated fatty acid ester-derived repeating units based on 100 wt % of the vinyl chloride-based copolymer, and
    comprises the repeating units respectively derived from the cis and trans isomers of the unsaturated fatty acid ester in a weight ratio of 60:40 to 99:1.

2. The vinyl chloride-based copolymer of claim 1, wherein the unsaturated fatty acid ester is an unsaturated dicarboxylic acid ester.

3. The vinyl chloride-based copolymer of claim 1, wherein the cis isomer of the unsaturated fatty acid ester is a compound of Formula 1, and the trans isomer of the unsaturated fatty acid ester is a compound of Formula 2:

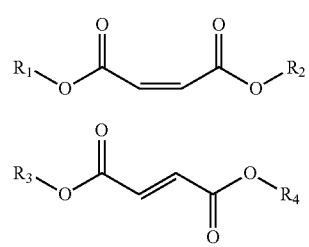

[Formula 1]

[Formula 2]

in Formulae 1 and 2,
    $R_1$ to $R_4$ are each independently selected from the group consisting of an alkyl group having 2 to 16 carbon atoms, a cycloalkyl group having 3 to 16 carbon atoms, and a combination thereof.

4. The vinyl chloride-based copolymer of claim 3, wherein $R_1$ to $R_4$ are each independently a linear or branched alkyl group having 6 to 10 carbon atoms.

5. The vinyl chloride-based copolymer of claim 1, wherein the vinyl chloride-based copolymer comprises 65 wt % to 80 wt % of the vinyl chloride monomer-derived repeating unit based on 100 wt % of the vinyl chloride-based copolymer; and 20 wt % to 35 wt % of the cis and trans isomers of the unsaturated fatty acid ester-derived repeating units based on 100 wt % of the vinyl chloride-based copolymer.

6. The vinyl chloride-based copolymer of claim 1, wherein a polydispersity is in a range of 1.5 to 2.5.

7. The vinyl chloride-based copolymer of claim 1, wherein a weight-average molecular weight is in a range of 70,000 g/mol to 300,000 g/mol, and a number-average molecular weight is in a range of 50,000 g/mol to 150,000 g/mol.

8. The vinyl chloride-based copolymer of claim 1, wherein the vinyl chloride-based copolymer comprises:
65 wt % to 80 wt % of the vinyl chloride monomer-derived repeating unit based on 100 wt % of the vinyl chloride-based copolymer; and 20 wt % to 35 wt % of the cis and trans isomers of the unsaturated fatty acid ester-derived repeating units based on 100 wt % of the vinyl chloride-based copolymer, and
the repeating units respectively derived from the cis isomer and the trans isomer of the unsaturated fatty acid ester in a weight ratio of 85:15 to 99:1,
wherein the cis isomer of the unsaturated fatty acid ester is a compound of Formula 1, and the trans isomer of the unsaturated fatty acid ester is a compound of Formula 2:

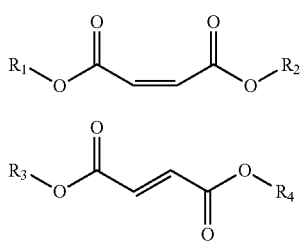

[Formula 1]

[Formula 2]

in Formulae 1 and 2, $R_1$ to $R_4$ are each independently a linear or branched alkyl group having 6 to 10 carbon atoms.

9. The vinyl chloride-based copolymer of claim 1, wherein the vinyl chloride-based copolymer further comprises a vinyl-based monomer-derived repeating unit, and
wherein the vinyl-based monomer is an olefin-based compound, vinyl esters, unsaturated nitriles, vinyl alkyl ethers, unsaturated fatty acids, or anhydrides of the unsaturated fatty acids, or a mixture of two or more thereof.

10. A method of preparing the vinyl chloride-based copolymer of claim 1, the method comprising a polymerization of a vinyl chloride monomer with a cis isomer and a trans isomer of an unsaturated fatty acid ester in the presence of a polymerization initiator,
wherein the vinyl chloride monomer and the cis and trans isomers of the unsaturated fatty acid ester are used in amounts to provide 65 wt % to 97 wt % of a vinyl chloride monomer-derived repeating unit based on 100 wt % of the vinyl chloride-based copolymer and 3 wt % to 35 wt % of cis and trans isomers of the unsaturated fatty acid ester-derived repeating units based on 100 wt % of the vinyl chloride-based copolymer in the prepared vinyl chloride-based copolymer, and
the cis isomer and the trans isomer of the unsaturated fatty acid ester are used in a weight ratio of 60:40 to 99:1.

11. The method of claim 10, wherein the vinyl chloride monomer and the cis and trans isomers of the unsaturated fatty acid ester are used in amounts to provide 65 wt % to 80 wt % of the vinyl chloride monomer-derived repeating unit based on 100 wt % of the vinyl chloride-based copolymer and 20 wt % to 35 wt % of the cis and trans isomers of the unsaturated fatty acid ester-derived repeating units based on 100 wt % of the vinyl chloride-based copolymer in the prepared vinyl chloride-based copolymer.

12. The method of claim 10, wherein the cis isomer of the unsaturated fatty acid ester is a compound of Formula 1, and the trans isomer of the unsaturated fatty acid ester is a compound of Formula 2:

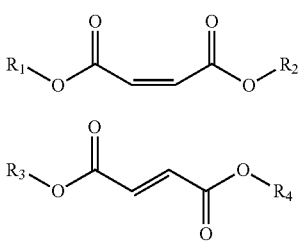

[Formula 1]

[Formula 2]

in Formulae 1 and 2,
$R_1$ to $R_4$ are each independently selected from the group consisting of an alkyl group having 2 to 16 carbon atoms, a cycloalkyl group having 3 to 16 carbon atoms, and a combination thereof.

13. The method of claim 10, wherein the polymerization is performed in a temperature range of 52° C. to 58° C.

14. The method of claim 10, wherein the polymerization is performed by suspension polymerization of the vinyl chloride monomer with the cis isomer and the trans isomer of the unsaturated fatty acid ester in a solvent in the presence of the polymerization initiator and a protective colloid auxiliary.

15. The method of claim 14, wherein the protective colloid auxiliary comprises one selected from the group consisting of a vinyl alcohol-based resin, cellulose, and an unsaturated organic acid polymer, or a mixture of two or more thereof.

16. The method of claim 14, wherein the protective colloid auxiliary comprises a mixture in which a vinyl alcohol-based resin and cellulose are mixed in a mixing ratio of 5:1 to 7:7, and
the vinyl alcohol-based resin comprises a mixture in which a first polyvinyl alcohol having a degree of hydration of greater than 50 wt % and equal to or less than 90 wt % and a second polyvinyl alcohol having a degree of hydration of 30 wt % to 50 wt % are mixed in a weight ratio of 2:1 to 1:2.

17. The method of claim 10, wherein the polymerization is performed by emulsion polymerization of the vinyl chloride monomer with the cis isomer and the trans isomer of the unsaturated fatty acid ester in a solvent in the presence of the polymerization initiator and an emulsifier.

18. The method of claim 10, wherein the polymerization is performed by solution polymerization of the vinyl chloride monomer with the cis isomer and the trans isomer of the unsaturated fatty acid ester in an inert organic solvent in the presence of the polymerization initiator.

19. The method of claim 10, wherein the polymerization is performed by bulk polymerization of the vinyl chloride monomer with the cis isomer and the trans isomer of the unsaturated fatty acid ester in the presence of the polymerization initiator.

20. The method of claim 10, wherein a vinyl-based monomer is further added during the polymerization, and
   wherein the vinyl-based monomer is an olefin-based compound, vinyl esters, unsaturated nitriles, vinyl alkyl ethers, unsaturated fatty acids, or anhydrides of the unsaturated fatty acids, or a mixture of two or more thereof.

* * * * *